US011670019B2

(12) United States Patent
Farm et al.

(10) Patent No.: US 11,670,019 B2
(45) Date of Patent: Jun. 6, 2023

(54) GPU ACCELERATED GEOSPATIAL QUERIES AND GEOMETRIC OPERATIONS

(71) Applicant: The Boeing Company, Chicago, IL (US)

(72) Inventors: Brian P. Farm, South Portland, ME (US); Malcolm Toon, Cape Elizabeth, ME (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 17/399,215

(22) Filed: Aug. 11, 2021

(65) Prior Publication Data

US 2023/0050854 A1 Feb. 16, 2023

(51) Int. Cl.
*G06T 11/20* (2006.01)
*G06F 16/9537* (2019.01)
*G06T 3/40* (2006.01)
*G06T 15/40* (2011.01)

(52) U.S. Cl.
CPC ......... *G06T 11/206* (2013.01); *G06F 16/9537* (2019.01); *G06T 3/40* (2013.01); *G06T 15/405* (2013.01)

(58) Field of Classification Search
CPC .................................................. G06F 16/9537
See application file for complete search history.

(56) References Cited

U.S. PATENT DOCUMENTS

2017/0039765 A1* 2/2017 Zhou et al. ............ G06T 7/521
2021/0090318 A1* 3/2021 Mehta et al. ............ G06N 3/08

* cited by examiner

*Primary Examiner* — Michelle L Sams
(74) *Attorney, Agent, or Firm* — Ferguson Braswell Fraser Kubasta PC

(57) ABSTRACT

A method including receiving a spatial query on spatial data. The spatial query has a spatial query extent including a subportion of the spatial data. A projection type is selected for the spatial query. A framebuffer is created for the selected projection type. Vertex buffers are established to hold a geometry of the selected projection type. The vertex buffers are passed from a CPU to a GPU. A spatial geometry of the spatial query extent is rendered into the framebuffer by projecting feature vertex data for features that fall at least partly within the spatial query extent into the vertex buffers. Rendering generates rendered framebuffer pixel values. Pixel values of the rendered framebuffer are retrieved as bytes on the CPU. A spatial query result is processed that includes or uses the pixel values.

20 Claims, 13 Drawing Sheets

GPU ACCELERATED GEOSPATIAL QUERIES AND GEOMETRIC OPERATIONS

BACKGROUND

Software applications may be used to display maps and other images on a graphical user interface (GUI). However, certain functions of map-related software applications may be computationally expensive.

The term "computationally expensive" means that a set of instructions will require a computer processor to use more than a pre-determined amount of the total computational resources available to the processor, or that the computer processor will require more than a pre-determined period of time to execute the set of instructions. For example, a set of instructions is computationally expensive if the executing processor takes more than a pre-determined time period to execute the set of instructions. In another example, a set of instructions is computationally expensive if a pre-determined percentage of the processor's available computational resources are used to execute the set of instructions.

In a specific example, it is preferred in some cases to render the results of a query on the GUI with sufficient speed that the user perceives little or no delay between entering the query and receiving a query result. Such a query is computationally expensive when, due to the time required by the computer to process the query and display the result, the user perceives a subjectively long delay between the query and the result. Such delays can result in certain functions of the map program being subjectively deemed inadequate, resulting in user dissatisfaction.

SUMMARY

The one or more embodiments provide for a method. The method includes receiving a spatial query on spatial data usable for generating a display on a graphical user interface (GUI) of a computer having a central processing unit (CPU) and a graphical processing unit (GPU) in communication with the CPU. The spatial query has a spatial query extent including a sub-portion of the spatial data. The method also includes selecting a projection type for the spatial query. The method also includes creating a framebuffer for the projection type by adjusting a framebuffer extent to correspond to the spatial query extent. The method also includes establishing vertex buffers to hold a geometry of the projection type. The method also includes passing the vertex buffers to the GPU. The method also includes rendering a spatial geometry of the spatial query extent into the framebuffer by projecting feature vertex data for features that fall at least partly within the spatial query extent into the vertex buffers. Projecting the vertex data is performed according to the projection type. Rendering generates rendered framebuffer pixel values. The method also includes retrieving pixel values of the rendered framebuffer as bytes on the CPU. The method also includes processing a spatial query result that includes or uses the pixel values.

The one or more embodiments also provide for a system. The system includes a central processing unit (CPU) and a graphical processing unit (GPU) in communication with the CPU. The system also includes a non-transitory computer readable storage medium in communication with the CPU and the GPU, and further storing computer readable program code which, when executed by a combination of the CPU and the GPU, performs a computer-implemented method. The computer-implemented method includes receiving a spatial query on spatial data useable for generating a display on a graphical user interface (GUI). The spatial query has a spatial query extent including a sub-portion of the spatial data. The computer-implemented method also includes selecting a projection type for the spatial query. The computer-implemented method also includes creating a framebuffer for the projection type by adjusting a framebuffer extent to correspond to the spatial query extent. The computer-implemented method also includes establishing vertex buffers to hold a geometry of the projection type. The computer-implemented method also includes passing the vertex buffers to the GPU. The computer-implemented method also includes rendering a spatial geometry of the spatial query extent into the framebuffer by projecting vertex data for the spatial query extent into the vertex buffers. Projecting the vertex data is performed according to the projection type. Rendering generates rendered framebuffer pixel values. The computer-implemented method also includes retrieving pixel values of the rendered framebuffer as bytes on the CPU. The computer-implemented method also includes processing a spatial query result that includes or uses the pixel values.

The one or more embodiments also provide for a non-transitory computer readable storage medium in communication with a central processing unit (CPU) and a graphical processing unit (GPU), and further storing computer readable program code which, when executed by a combination of the CPU and the GPU, performs a computer-implemented method. The computer-implemented method includes receiving a spatial query on spatial data usable for generating a display on a graphical user interface (GUI) of a computer having a central processing unit (CPU) and a graphical processing unit (GPU) in communication with the CPU. The spatial query has a spatial query extent including a sub-portion of the spatial data. The computer-implemented method also includes selecting a projection type for the spatial query. The computer-implemented method also includes creating a framebuffer for the selected projection type by adjusting a framebuffer extent to correspond to the spatial query extent. The computer-implemented method also includes establishing vertex buffers to hold a geometry of the projection type. The computer-implemented method also includes passing the vertex buffers to the GPU. The computer-implemented method also includes rendering a spatial geometry of the spatial query extent into the framebuffer by projecting vertex data for the spatial query extent into the vertex buffers. Projecting the vertex data is performed according to the projection type. Rendering generates rendered framebuffer pixel values. The computer-implemented method also includes retrieving pixel values of the rendered framebuffer as bytes on the CPU. The computer-implemented method also includes processing a spatial query result that includes or uses the pixel values.

Other aspects of the one or more embodiments will be apparent from the following description and the appended claims.

DETAILED DESCRIPTION

Figure 1:
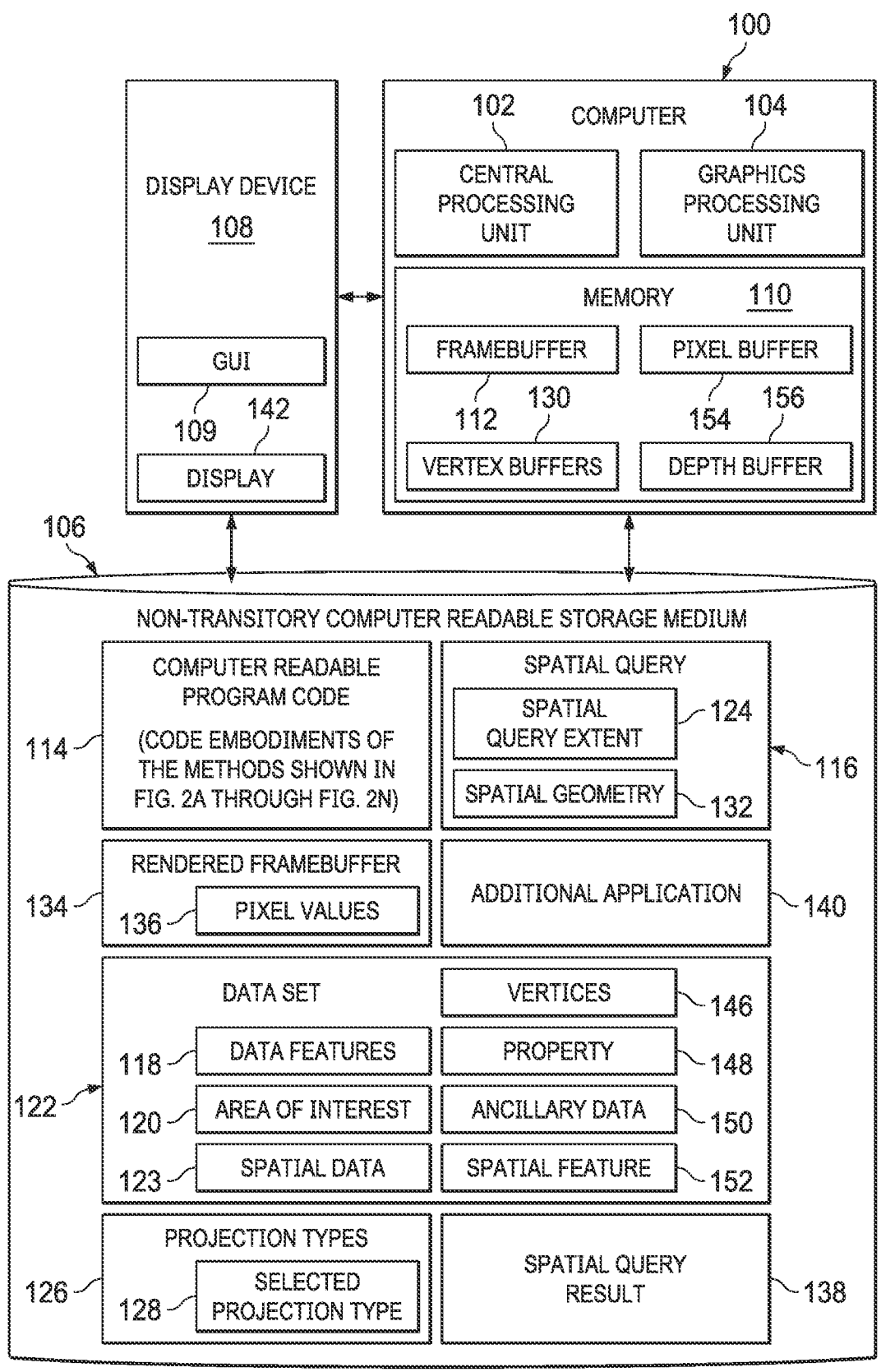
FIG. 1 shows a computing system, in accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term "connected to" contemplates at least two meanings. In a first meaning, unless otherwise stated, "connected to" means that component A was, at least at some point, separate from component B, but then was later joined to component B in either a fixed or a removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, the one or more embodiments relate to improving the speed of a computer when performing a query on geospatial data representing features on a map. Such spatial queries involve large data sets and many features. Thus, the following sub-tasks can be computationally expensive and time consuming for a processor: i) projecting the map features and the user-specified query boundaries into the same projected map coordinate system, ii) checking each feature to determine whether or not each feature intersects the query area, and iii) (depending on query) clipping the resulting geometry to the requested query boundary region. For an interactive application in which the user can update the query in real time, the query very often cannot keep up with the user's expectations, resulting in a very slow update process and a halting, delayed, or otherwise unsatisfactory user experience.

The one or more embodiments improves the functioning of a computer by speeding up spatial queries by setting up the queries to be performed on the device's GPU in a particular manner. The query leverages the highly parallel, fast processing and math used to perform real-time graphics updates on the device. In addition, some of the steps required in a CPU-based solution (such as determining whether geometry is inside or outside the query area, and intersecting geometry to provide clipped results) are functionally eliminated when using the GPU. The GPU can perform certain calculations at greatly reduced computational cost as part of the normal graphics processing pipeline of the GPU.

The steps in the one or more embodiments are summarized as follows. First, project the feature data points and query boundaries into the same projection space. Second, pass the feature geometry into the GPU as a vertex buffer, with optional vertex attributes indicating the attributes of the geometry that are relevant to the query. Third, create a GPU render buffer (possibly performed off-screen) with dimensions appropriate to the projected query area. Fourth, render the geometry into the GPU buffer, using a vertex shader that associates any additional attributes with each vertex, and a fragment shader that takes these attributes and uses them to set the output channels for the render. In graphics rendering terminology, these output channels would normally be taken as the output pixel color and transparency. The one or more embodiments render the output channels offscreen, and interpret the output as the combination of geometry and attributes of interest. Fifth, and finally, retrieve the render buffer pixel values as bytes on the CPU, and use these as the results of the query.

Figure 9A:
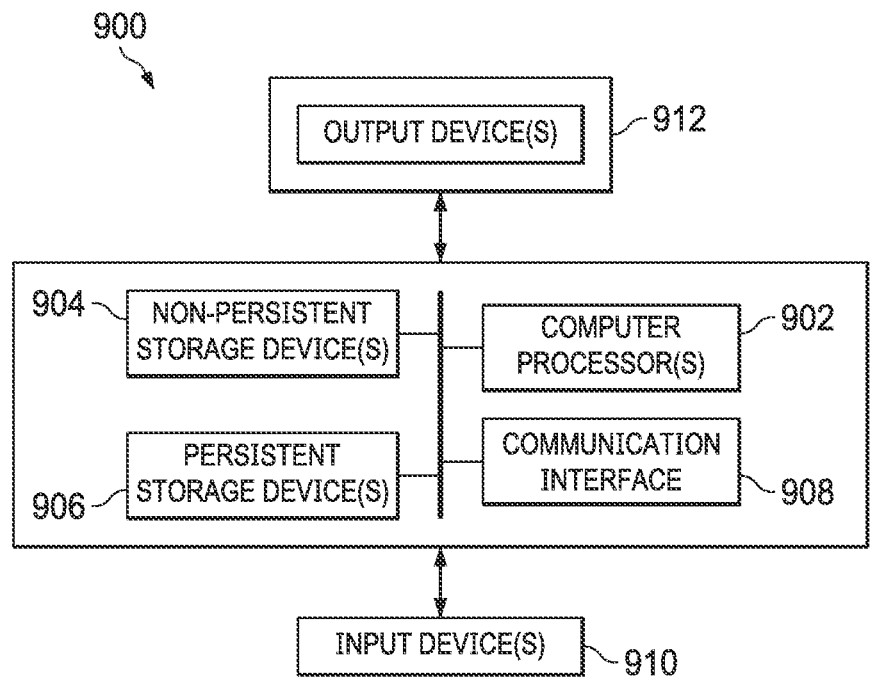
FIG. 9A and FIG. 9B show a computing system and network environment, in accordance with one or more embodiments.
Figure 9B:
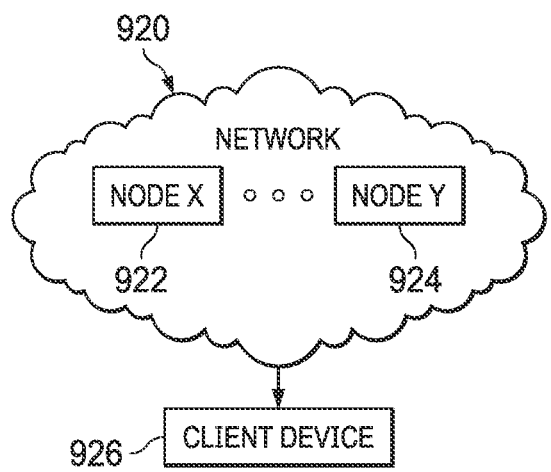

Attention is now turned to the figures. The system shown in FIG. 1 includes a computer (100). The computer (100) may be a mobile phone, tablet computer, laptop computer, desktop computer, server computer, or some other computing device. The computer (100) may be in the form of a distributed computing environment, such as shown in FIG. 9A and FIG. 9B.

The computer (100) includes a CPU (102) (i.e., a central processing unit). The CPU (102) is a computer processor, possibly a logical processor supported by a hardware processor, that is responsible for executing and managing various operations of the computer. Such operations include data exchange between various memory types, rendering data (in some cases), executing algorithms, etc.

The computer (100) also includes, in this example, a GPU (104) (i.e., a graphical processing unit) in communication with the CPU (102). A GPU is also a hardware processor or logical processor, but has been arranged and/or programmed to be optimized with respect to the processing of graphical information. In some examples, the GPU and CPU are implemented on the same chip, such as the M1® available from APPLE®.

The computer (100) also includes a non-transitory computer readable storage medium (106) in communication with one or both of the CPU (102) and the GPU (104). The non-transitory computer readable storage medium (106) is a permanent or semi-permanent storage medium in which algorithms and/or data may be stored, as described further below.

The computer (100) also includes, or is in communication with, a display device (108). The display device (108) is a computer screen, tablet screen, monitor, television, etc. configured to display information. The display device (108) may be part of the computer (100), or may be a remote display device which receives information to display from the CPU (102) and/or the GPU (104). In other words, the display device (108) may display data provided by the CPU (102), by the GPU (104), or may display data provided from the GPU (104) to the CPU (102) and then transmitted to the display device (108).

The display device (108) may display a GUI (109) ("graphical user interface"). The GUI (109) is a graphical presentation of software as presented to the user on the display device (108). Thus, for example, the user may interact with widgets on the GUI (109) in order to control software. The GUI (109) may include areas that display results, such as videos or images. The GUI (109) may also be a software control system with which the user interacts, and the images are displayed in other areas of the display device (108).

The computer (100) also includes a memory (110). The memory (110) is a transitory computer storage medium such as random access memory ("RAM"), but in other embodiments may be another form of the non-transitory computer readable storage medium (106). The memory (110) is used during execution of the one or more embodiments, by the CPU (102), the GPU (104), or a combination thereof.

The memory (110) includes a framebuffer (112). The framebuffer (112) is a portion of the memory (110) containing a bitmap that drives a video display on the display device (108). Thus, the framebuffer (112) is a memory buffer containing data representing the pixels in a video frame. In an embodiment, the GPU (104) includes the framebuffer (112) in a core of the GPU (104). Circuitry that establishes the framebuffer (112) may converts an in-memory bitmap into a video signal that can be displayed on the display device (108). The framebuffer (112) may also be referred to as a render buffer.

The memory (110) may also include one or more vertex buffers (130). Each of the vertex buffers (130) is an area of memory that holds the vertices (146). In some embodiments, the vertex buffers (130) hold the vertices (146). Thus, for example, the vertex buffers (130) may hold calculated vertices (146) after applying the projection type (128), described further below, on the CPU (102). In other embodiments, the vertex buffers (130) hold the vertices (146) with their original values, and the projection type (128) is applied on the GPU (104) within the vertex shader program.

The memory (110) may also include a pixel buffer (154). The pixel buffer (154) is a type of buffer that holds pixel values (136), described further below.

The memory (110) may also include a depth buffer (156). The depth buffer (156) is used, optionally, in cases where there may be overlapping features. In this case, the data features (118) may have different attribute values (e.g., light icing vs. severe icing). If the data features (118) overlap, the most extreme value for the final output is selected at each pixel. Depth testing is applied to allow the GPU (104) to automatically and quickly decide which value to preserve for the final output. For this purpose, the depth buffer (156) may be created for the GPU (104) to have a size (in pixels) as a size of the framebuffer (112) of the GPU (104). The depth buffer (156) has the same number of pixels (including the same number of pixel rows and columns) as the framebuffer (112), but not necessarily the same number of bits. Depending on the specific design parameters, the framebuffer (112) may have 8, 16, or 32 bits per pixel, for example, whereas depth buffers may have 16 or 32 bits per pixels. Various combinations are possible and used, according to design parameters.

The non-transitory computer readable storage medium (106) may store additional information or data. For example, the non-transitory computer readable storage medium (106) may store a spatial query (116). A "spatial query" is a computerized request to locate one or more data features (118) that fall partly or entirely within a specified area of interest (120) of a data set (122) that represents all represented features in a physical space. The data set (122) may be considered spatial data (123). The spatial data (123) is data that describes particles, objects, or other tracked information in two dimensional or three dimensional space.

The non-transitory computer readable storage medium (106), also stores vertices (146). A vertex is the location of a point from which a line is drawn from, or to which a line is drawn on the display device (108). The vertices (146), taken together, thus define shapes displayed on the display device (108). Thus, the spatial data (123) may be characterized as a sequence of particles or other tracked properties in the data set (122), as well as the vertices (146).

The data features (118) may include a spatial feature (152). The spatial feature (152) is a type of feature that applies to the spatial data (123).

Figure 2A:
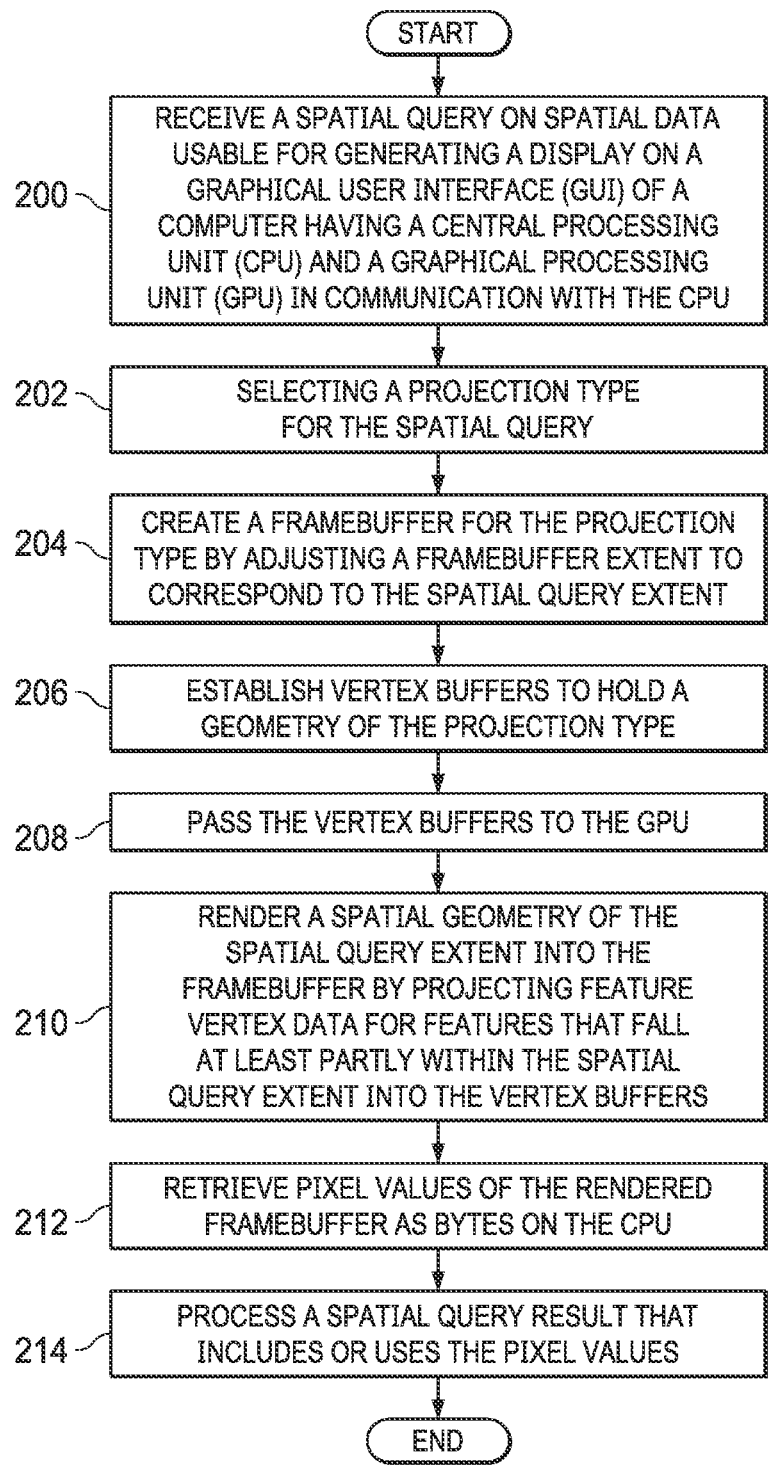
FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 2L, FIG. 2M, and FIG. 2N are flowcharts, in accordance with one or more embodiments.

The non-transitory computer readable storage medium (106), also stores computer readable program code (114). The computer readable program code (114) is one or more computer-readable algorithms executable by the CPU (102) and/or the GPU (104). For example, the algorithms described with respect to FIG. 2A through FIG. 2N are expressed in the computer readable program code (114). Accordingly, when the computer readable program code (114) is executed by the CPU (102) and/or the GPU (104), one or more of the methods of FIG. 2A through FIG. 2N are executed on the computer (100), with any displays being rendered on the display device (108). Unless otherwise stated, it is contemplated that the methods of FIG. 2A through FIG. 2N are executed using a combination of the CPU (102) and the GPU (104).

In some embodiments. The data features (118) are defined as one or more objects displayed on the display device (108). Thus, the data features (118) may be one or more of points, lines, or polygons on a map, weather or other data represented on the map, or other objects being rendered, or which could be rendered, on the display device (108). The data set (122) is the whole body of data that includes all represented data features (118). The area of interest (120) is a portion of the data set (122), not necessarily represented by a physical area, which contains the data features (118) that are of interest.

An example of a "spatial query" is to perform a spatial intersection to clip relevant geometry to the area of interest (120). Another example of a "spatial query" is to receive user input on a graphical user interface that displays a map, the user input being a request for detail with respect to a sub-portion of the map. Thus, the spatial query (116) may be a graphical query having an input received via the GUI (109). The spatial query (116) may also be one or more points in the data set (122) provided by a user. The spatial query (116) may also include one or more points from a non-graphical source, such as another software application that requests, as input, an output of the computer readable program code (114). Many other examples of the spatial query (116) are possible.

The spatial query (116) has a spatial query extent (124). The spatial query extent (124) represents a defined region in space for which additional information is requested. The spatial query (116) is directed to finding information about which spatial data features occur within the spatial query extent (124). For example, where the area of interest (120) is the route corridor for a multi-leg route, the spatial query extent (124) is the combination (i.e. the totality) of rectangular regions containing each of the legs, where each region extends from the start of the leg to the end of the leg, and extends a specified distance to the side of the line connecting the start and end points for the leg. Each of these "query regions" forms a component of the full spatial query extent (124).

The spatial query (116) may include one or more properties from the data set (122). A property (148) in the data set (122) is data or metadata that describes or relates to the spatial data (123). A property (148) may be a data feature (118), but a property (148) may also be information that is ancillary to the spatial data (123). For example, the property (148) may be wind velocity of an airmass being tracked in the spatial data (123). The property (148) could be a color of a weather pattern being tracked in the spatial data (123). Many examples are possible. The property (148) may be displayed on the display device (108).

The property (148) may be tracked using ancillary data (150). The ancillary data (150) is data relating to the spatial data (123) (i.e., the property (148) is taken from the ancillary data (150)). The ancillary data (150) may be assigned to the data features (118) and/or the property (148) as attributes of the vertices (146). Thus, the computer may assign, as attributes of the vertices (146), the ancillary data (150) relating to a type of the data features (118) in the spatial query extent (124).

As a specific example, the ancillary data (150) is data such as the category of a weather polygon (e.g., no icing, light icing, moderate icing, or severe icing). The ancillary data (150) is one or more values that represent the meaning of the polygon or other feature defined by the vertices (146). As such, the ancillary data (150) is independent of the spatial query extent (124). In other words, the ancillary data (150) is associated with the spatial data (123) regardless of any queries. In a graphics rendering application, the attributes may represent information such as the color, reflectivity, or transparency of a shape to be rendered on the screen. In the one or more embodiments, the feature type (e.g. icing) may be passed as a value that is rendered into the framebuffer (112) in lieu of color.

The non-transitory computer readable storage medium (106) may also store one or more of the projection types (126). The projection types (126) are mathematical transformations that translate data represented in one coordinate system into another coordinate system (e.g., from an absolute coordinate system representing the location of particles in real space to a screen coordinate system tied to the display device (108). Each different transformation is a different one of the projection types (126).

The projection type (128) is the projection type that is selected, automatically, for use for the particular spatial query (116) being processed. The projection type (128) is selected to maintain a selected geometry in a recoverable fashion, and may depend on the specific nature of the spatial query (116). For example, if the spatial query (116) is a graphical section of a map in order to show a zoomed-in section of that section of the map, then the projection type (128) is a transformation between the screen coordinate system of the whole map and the section coordinate system of the selected section.

In another example, if the spatial query (116) is to extract features within a fixed-width linear corridor surrounding a path between two points on the Earth, the spatial query extent (124) would be a rectangular bounding box that extends from one point to the other, and extends one-half the corridor width on either side of the line connecting the two points. The projection in this case could be a transformation that converts the geodetic coordinates of the points and bounding box into a two-dimensional representation; i.e., a map projection, with the line between the two points along the resulting X axis, the first point at the origin (0,0), and the second point at the projected location (0,y), where y is the real world distance between the two points. In this example, a cylindrical oblique map projection would perform such a transformation.

The model-view-projection matrix is constructed to translate and scale the resulting, projected coordinates so that the spatial query extent (124) matches the portion of the framebuffer (112) into which the features will be rendered. The model-view-projection matrix is applied in the GPU (104) vertex shader application or circuitry. The combined transformations of the selected projection and the model-view-projection matrix are such that the spatial query extent (124) aligns with all or part of the framebuffer (112) into which the features will be rendered. This action is what allows the GPU (104) to clip features to the spatial query extent (124).

The framebuffer (112) may be created for the projection type (128). Creation of the framebuffer (112) is described with respect to FIG. 2A.

The spatial query (116) produces a new spatial geometry (132). The spatial geometry (132) is a rendered or renderable set of images that result from the spatial query (116). Thus, for example, the spatial geometry (132) of the spatial query (116) may be rendered into the framebuffer (112) by projecting the vertex data for the data features (118) into the vertex buffers (130), and rendering the vertex data on the GPU (104) using the model-view-projection matrix.

The non-transitory computer readable storage medium (106) (or possibly the memory (110)) also stores a rendered framebuffer (134). The rendered framebuffer (134) is data that has been processed so that the data can be rendered or otherwise displayed on the display device (108). The rendered framebuffer (134) includes one or more pixel values (136). The pixel values (136) are numbers that represent how a given pixel on the display device (108) should be displayed. A pixel is a fundamental unit that projects a color of light onto the display device (108). Through the use of millions of pixels (i.e., individual colors of light), highly complex pictures or videos can be rendered on the display device (108).

The pixel values (136) may be associated with a pixel extent. A pixel extent is the number of the pixel values (136) within the spatial query extent (124).

The non-transitory computer readable storage medium (106) (or possibly the memory (110)) also stores a spatial query result (138). The spatial query result (138) is an output that results from executing the spatial query (116). For example, if the spatial query (116) is to render more detail regarding weather displayed on the non-transitory computer readable storage medium (106), then the spatial query result (138) could be an overlay that shows the requested additional detail on the display device (108). In another example, the spatial query result (138) could be a set of numbers that reflect the state of a system, with the numbers having been derived by some other process which takes the pixel values as input. Thus, the spatial query result (138) includes or uses the pixel values (136).

The non-transitory computer readable storage medium (106) may also store an additional application (140) as part of the computer readable program code (114). The additional application (140) is a software application that takes, as input, at least the spatial query result (138) and outputs some other function. For example, assume that the spatial query (116) is a graphical query on the GUI (109) with respect to weather displayed on the GUI (109). The spatial query result (138) is more detailed data on the weather within the spatial query extent (124). The additional application (140) may be a program that predicts an estimated flight path for an aircraft to avoid turbulence levels above some pre-determined turbulence level. The additional application (140) takes, as input, at least the spatial query result (138) and uses the spatial query result (138) (in part) to determine the estimated flight path. Thus, the spatial query result (138) may be renderable data, but need not be renderable data.

The display device (108) may show a display (142). The display (142) is an image created from the pixel values (136) in the rendered framebuffer (134), and thus may be a display of the spatial query result (138). An example of the display (142) may be a map of terrain. In this case, for example, displaying the spatial query result (138) may take the form of the display (142) overlaying the GUI (109) and/or some other image on the display device (108). The display (142) could also be displayed inside the GUI (109). The display (142) in this example may be weather information over the terrain. If the display (142) is an additional display, then the display (142) may be characterized as a second image overlaid another image (the GUI or some other display) on the display device (108).

While FIG. 1 shows a configuration of components, other configurations may be used without departing from the scope of the one or more embodiments. For example, various components may be combined to create a single component. As another example, the functionality performed by a single component may be performed by two or more components.

FIG. 2A through FIG. 2N are flowcharts, in accordance with one or more embodiments. The methods of FIG. 2A through FIG. 2N may be executed using the system of FIG. 1. The methods of FIG. 2A through FIG. 2N are implemented as the computer readable program code (114) in FIG. 1. Thus, the methods of FIG. 2A through FIG. 2N may be executed using one or more components of the computing system and network shown in FIG. 9A and FIG. 9B.

FIG. 2A shows a method of processing a spatial query result. Step 200 includes receiving a spatial query on spatial data usable for generating a display on a graphical user interface (GUI) of a computer having a central processing unit (CPU) and a graphical processing unit (GPU) in communication with the CPU. The spatial query has a spatial query extent having a sub-portion of the spatial data. The spatial query may be received via a user interface or from an additional application.

Step 202 includes determining, from among a number of projection types, a selected projection type for the spatial query. In other words, depending on the nature of the spatial query, a projection type appropriate to the spatial query is selected. Examples of step 202 are given in FIG. 5 through FIG. 8D.

Step 204 includes creating a framebuffer for the selected projection type, wherein creating includes adjusting a framebuffer extent to correspond to the spatial query extent. In other words, the size of the framebuffer is adjusted to be the same as or a multiple of the spatial query extent. The GPU has hardware or software for accomplishing this step.

For example, if the spatial query extent represented a region on the Earth 80 miles long and 10 miles wide, a framebuffer could be created that was 800 pixels high and 100 pixels wide. In this case, each framebuffer pixel represents a region on the ground 0.1 mile by 0.1 mile, with the framebuffer corresponding to the spatial query extent.

Step 206 includes establishing vertex buffers to hold a geometry of the selected projection type. Vertex buffers are established in the memory for holding the vertices.

Step 208 includes passing the vertex buffers to the GPU. The vertex buffers are passed by a command from the CPU to the GPU.

Step 210 includes rendering a spatial geometry of the spatial query extent into the framebuffer by projecting feature vertex data for features that fall at least partly within the spatial query extent into the vertex buffers. Projecting the vertex data is performed according to the selected projection type. In other words, the mathematical transformation that is represented by the projection is used to project the feature vertex data to the vertex buffers. Rendering generates rendered framebuffer pixel values.

Step 212 includes retrieving pixel values of the rendered framebuffer as bytes on the CPU. The CPU either retrieves the pixel values, or the GPU pushes the pixel values to the CPU.

Step 214 includes processing a spatial query result that includes or uses the pixel values. The CPU uses the pixel values to process the spatial query result. For example, if the spatial query result is another image, then the pixel values can be used to display the other image. If the spatial query result is pixels used by another program, then the spatial query result is passed to the other program. Other examples are shown in FIG. 2B.

Figure 2B:
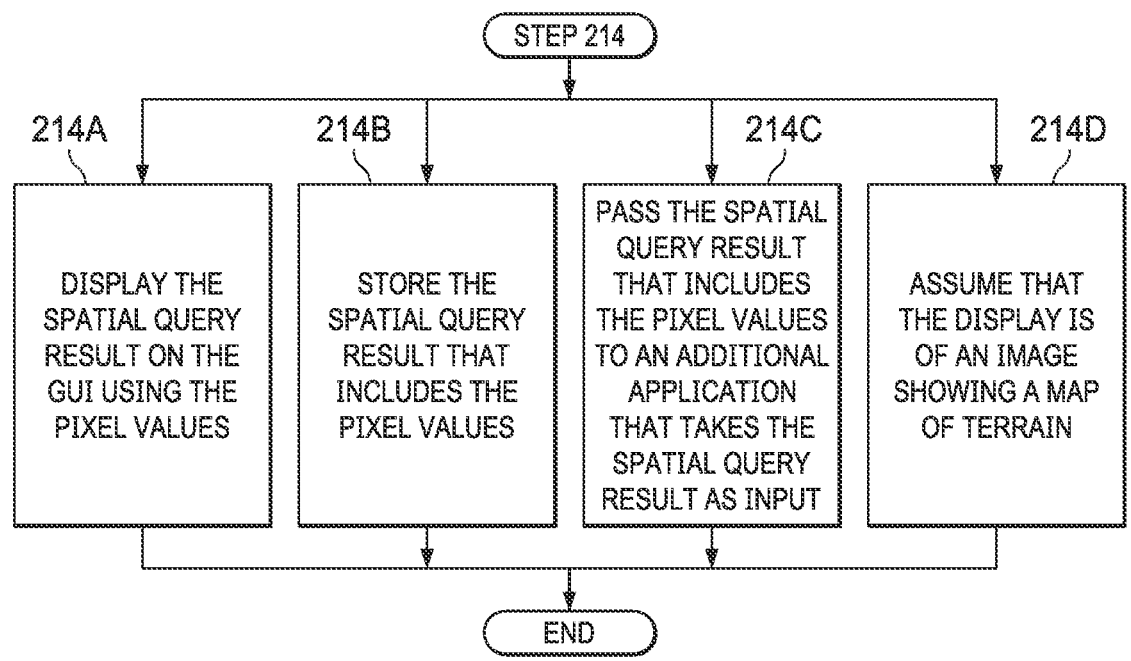

Attention is now turned to FIG. 2B. FIG. 2B shows examples of how step 214 in FIG. 2A may be executed. Thus, the steps of FIG. 2B are shown as being performed concurrently. However, in some examples only one of the step shown in FIG. 2B may be performed. In other examples two or more of the steps may be shown, either concurrently or in sequence. In each case, the steps indicate an example of processing the spatial query result.

Step 214A includes displaying the spatial query result on the GUI using the pixel values. Alternatively, the spatial query result may be displayed on some other portion of the display device, or overlay one or more portions of the display device.

Using the pixel values may include rendering the pixel values. However, rendering of the pixel values is not necessary to use the pixel values. For example, in one embodiment (a profile view), the display of the query results uses the pixel values indirectly. The pixels, by virtue of the ability to convert pixels back to geodetic locations, are converted to linear position along the route, and only the locations of transitions, where the pixel value changes from one value to a different value in adjacent pixels, are passed on for display. This procedure uses the pixels values, indirectly, in a simplified form.

Step 214B includes storing the spatial query result that includes the pixel values. Storing may be performed by passing the spatial query result to a non-transitory computer readable storage medium.

Step 214C includes passing the spatial query result that includes the pixel values to an additional application that takes the spatial query result as input. For example, the additional program may call the program that executes the method of 2A, which then treats the spatial query result as output to provide to the other program.

Step 214D assumes that the display is of an image showing a map of terrain. In this case, step 204D includes displaying, using the pixel values as input data, the spatial query result as a second image overlaid on the image, wherein the second image displays weather information over the terrain.

For display, generally, the one or more embodiments may use the pixel values directly or indirectly. In many cases, the pixels values are not displayed directly as pixels constituting an image. Rather, the pixel values are used as data to generate whatever representation is appropriate.

Figure 2C:
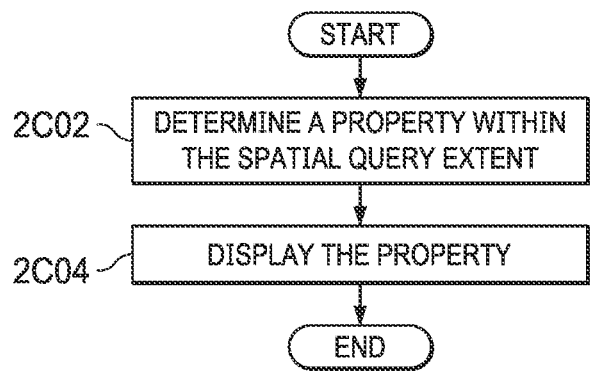

Attention is turned to FIG. 2C. FIG. 2C may be an extension of FIG. 2A. The method of FIG. 2C assumes that the spatial data is a sequence of vertices. In this case, step 2C02 includes determining a property within the spatial query extent. The property is determined by identifying a property of interest, such as for example by selection by a user or by automatic selection by a program.

Step 2C04 includes displaying the property. The property is displayed in a number of ways, such as by highlighting existing features on the display device, adding new features, overlaying additional images on the display device, etc. Note that step 2C04 is not necessary for all embodiments. As noted elsewhere, the property may be provided to some other logic or computer process.

Figure 2D:
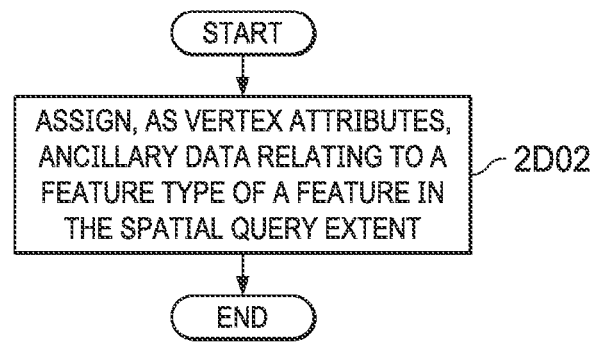

Attention is turned to FIG. 2D. FIG. 2D is an extension of the method of FIG. 2A.

Step 2D02 includes assigning, as vertex attributes, ancillary data relating to a feature type of a feature in the spatial query extent. As indicated above, the ancillary data is data such as the category of a weather polygon (e.g., no icing, light icing, moderate icing, or severe icing), which is typically a value that represents the meaning of the polygon or other feature defined by the vertices. The one or more embodiments pass the feature type (e.g. icing) as a value that is then rendered into the framebuffer in lieu of color.

Figure 2E:
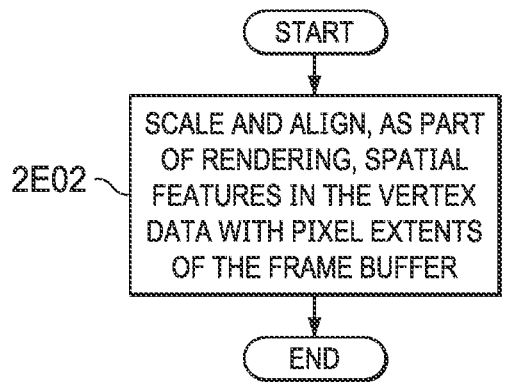

Attention is turned to FIG. 2E. FIG. 2E is an extension of the method of FIG. 2A.

Step 2E02 includes scaling and aligning, as part of rendering, spatial features in the vertex data with pixel extents of the framebuffer. Scaling is performed by projecting the data defining the positions of spatial features into a new coordinate system that is finer or less fine than some other coordinate system (e.g., shows more or less detail). Aligning is performed by causing the vertex data to align with pixel data within the framebuffer.

Figure 2F:
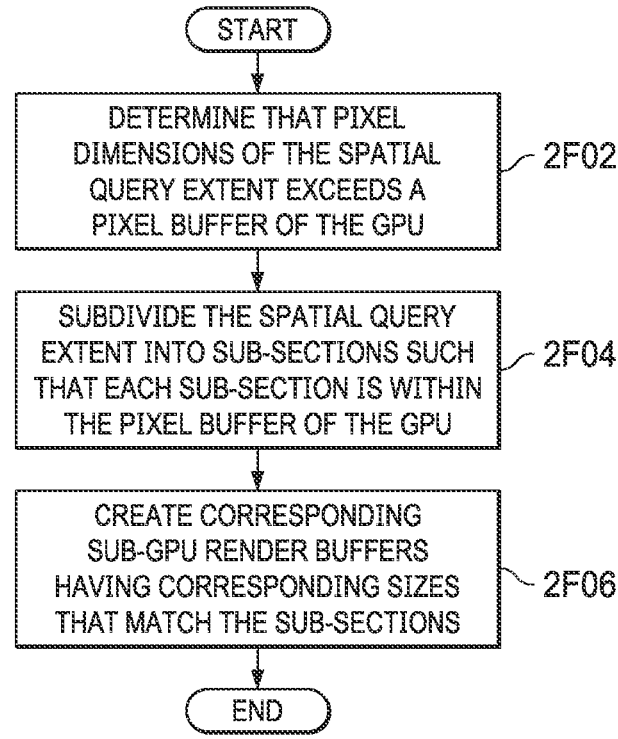

Attention is turned to FIG. 2F. FIG. 2F is an extension of the method of FIG. 2A.

Step 2F02 includes determining that pixel dimensions of the spatial query extent exceeds a pixel buffer of the GPU. In other words, the pixel buffer is not large enough to handle the pixel dimensions of the spatial query extent. For example, assume the GPU pixel buffer has a maximum size of 2048 pixels by 2048 pixels. Assume further that the spatial query extent, when scaled to pixels as in step 2E02, has an extent of 100 pixels by 4096 pixels. In this case, the spatial query extent will not fit in the pixel buffer as a single contiguous region.

Step 2F04 includes subdividing the spatial query extent into sub-sections such that each sub-section is within the pixel buffer of the GPU. In other words, to fit the spatial query into the pixel buffer, the spatial query extent is broken into a number of sub-sections, with each of the sub-sections being smaller than the pixel buffer. In the example given above, the scaled spatial query extent could be split into two subsections of 100 pixels by 2048 pixels each. Each of the sub-sections subsequently are rendered into a different portion of the GPU pixel buffer.

Step 2F06 includes creating corresponding sub-GPU render buffers having corresponding sizes that match the sub-sections. A sub-GPU render buffer is established by using a part of the framebuffer (112). Each sub-section of the framebuffer (112) then has a size that matches the size of the sub-sections.

Figure 2G:
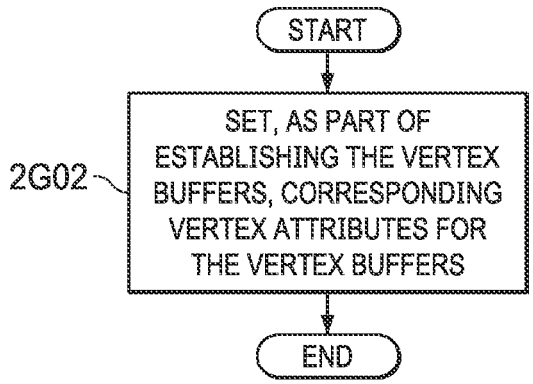

Attention is turned to FIG. 2G. FIG. 2G is an extension of the method of FIG. 2A.

Step 2G02 includes setting, as part of establishing the vertex buffers, corresponding vertex attributes for the vertex buffers. The corresponding vertex attributes represent feature properties for the spatial query. For example, the vertex attributes may be stored as metadata for the vertices. In this manner, vertex attributes for the vertex buffers are established.

Figure 2H:
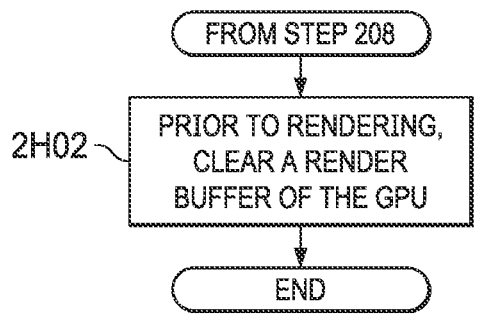

Attention is turned to FIG. 2H. FIG. 2H is performed prior to step 210 in FIG. 2A.

Step 2H02 includes, prior to rendering, clearing a render buffer of the GPU. Clearing the render buffer (or the framebuffer (112)) is performed by submitting a clear command to or from the GPU.

Figure 2I:
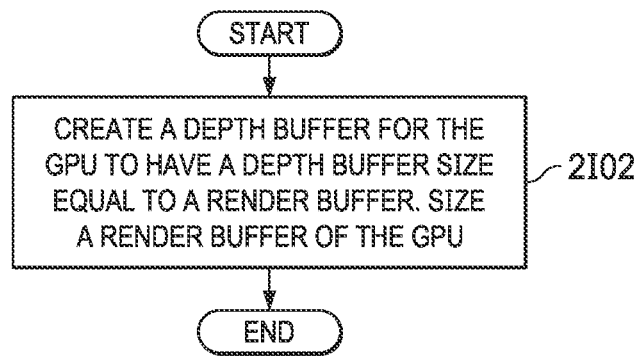

Attention is turned to FIG. 2I. FIG. 2I is an extension of the method of FIG. 2A.

Step 2I02 includes creating a depth buffer for the GPU to have a depth buffer size equal to a render buffer size a render buffer of the GPU. As noted above, "equal size" means the same pixel dimensions, but not necessarily the same number of bits or bytes. Step 2I02 is optional.

A depth buffer is used, optionally, in cases where there may be overlapping features. In this case, the features may have different, ranked attribute values (e.g., light icing vs. severe icing). When the features overlap, the most extreme value is selected for the final output at each pixel. The attribute values are converted to depth (Z) values in the vertex shader, allowing depth testing to be applied, which allows the GPU to automatically and quickly decide which value to preserve for the final output.

Figure 2J:
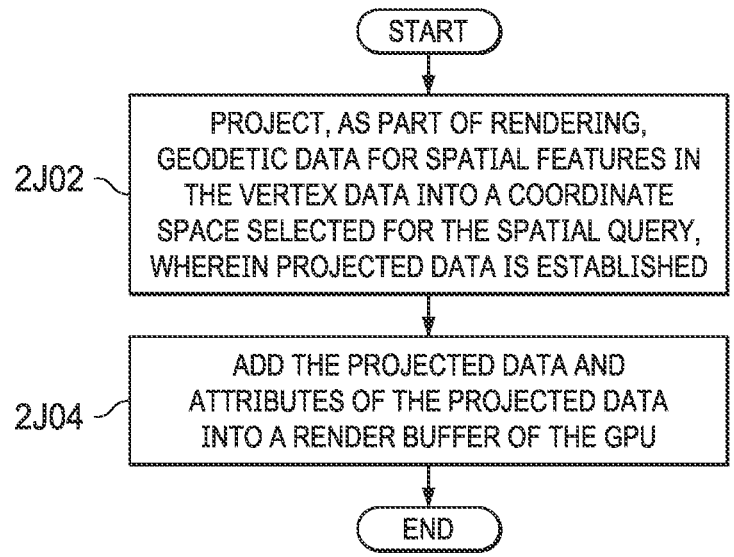

Attention is turned to FIG. 2J. FIG. 2J is an extension of FIG. 2A.

Step 2J02 includes projecting, as part of rendering, geodetic data for spatial features in the vertex data into a coordinate space selected for the spatial query, wherein projected data is established. Geodetic data is data relating to position on a globe (e.g., the Earth). The geodetic data relates to the spatial features in the vertex data. Thus, the geodetic data is projected into a coordinate space of the spatial query.

Step 2J04 includes adding the projected data and attributes of the projected data into a render buffer of the GPU. The projected data and attributes are then used as part of rendering the image.

Figure 2K:
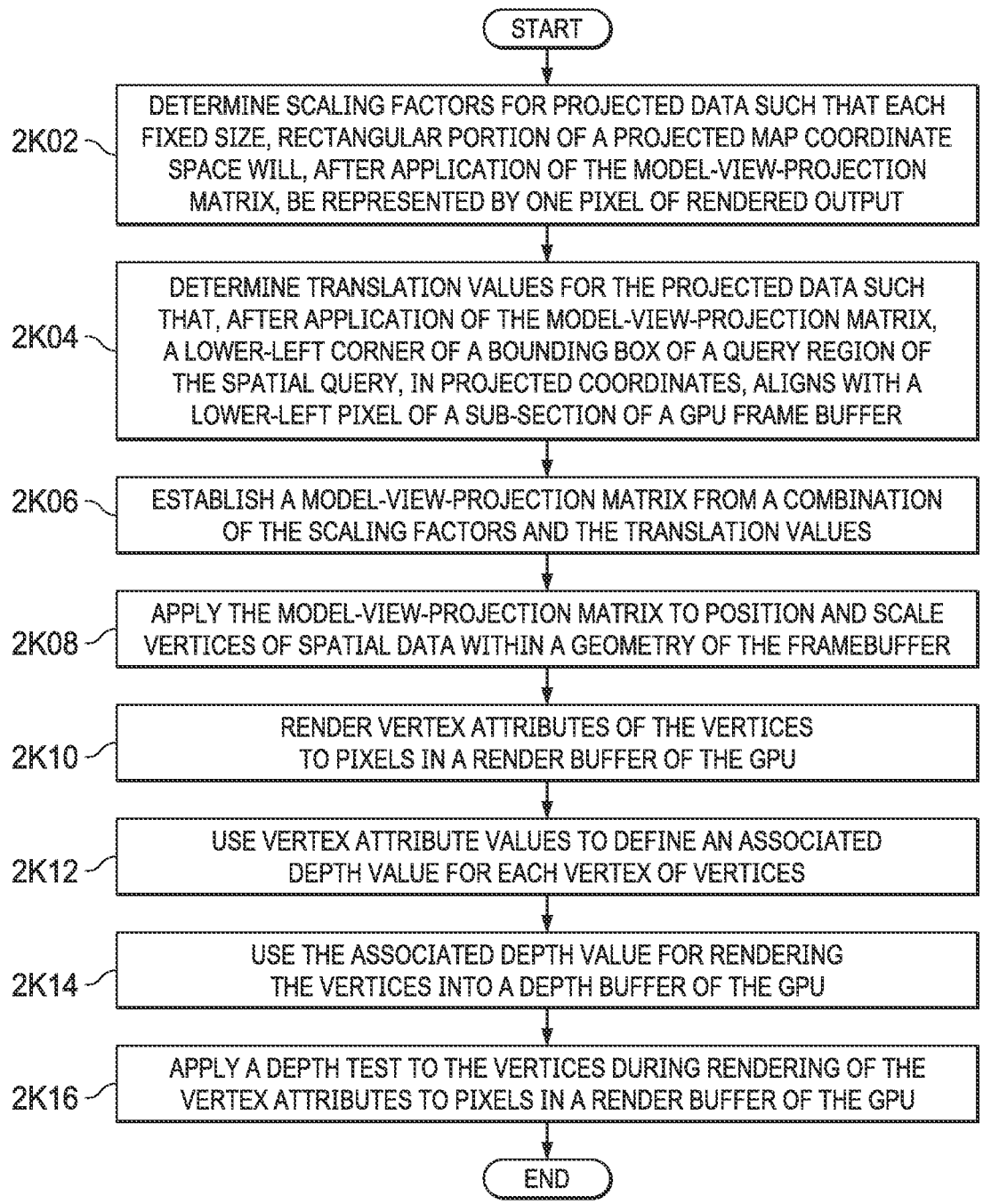

Attention is turned to FIG. 2K. FIG. 2K is an extension of FIG. 2A. FIG. 2K may also be characterized as an elaboration of step 2J04 of FIG. 2J. FIG. 2K is a method of creating a model-view-projection matrix for rendering, and of using the created model-view-projection matrix. As indicated further below, the process of creating and using the model-view-projection matrix may be separated into two or more methods.

Step 2K02 includes determining scaling factors for projected data such that each fixed size, rectangular portion of a projected map coordinate space will, after application of the model-view-projection matrix, be represented by one pixel of rendered output. See, for example, FIG. 8A through FIG. 8D. Note how the process in FIG. 8C and FIG. 8D implicitly reduces dimensionality. Additional details are described with respect to FIG. 8A through FIG. 8D.

Step 2K04 includes determining translation values for the projected data such that, after application of the model-view-projection matrix, a lower-left corner of a bounding box of a query region of the spatial query, in projected coordinates, aligns with a lower-left pixel of a sub-section of a GPU frame buffer.

Step 2K06 includes establishing a model-view-projection matrix from a combination of the scaling factors and the translation values. The model-view-projection matrix is an orthographic projection matrix that is applied to each projected vertex in the vertex buffer to scale and align spatial data vertices with the GPU frame buffer in a fashion that allows projected coordinates to be retrieved from GPU frame buffer pixel locations.

Note that the acts of scaling and translating the data do not happen until application of the model-view-projection matrix. Thus, the steps for determining the scaling factors, and determining the translation values, may be performed either sequentially as shown, or in parallel. In either case, the model-view-projection matrix is created using these values calculated at step 2K02 and step 2K04.

In some embodiments, the, model-view-projection matrix from step 2K06 may be stored for further processing. Additionally, steps 2K02, 2K04, and 2K06 may also be expansions of the method of FIG. 2J. In this case, steps 2K02, 2K04, and 2K06 could be performed between step 2J02 and step 2J04. Additionally, steps 2K08, 2K10, 2K12, 2K14, and 2K16 may be viewed as expansions of step 2J04.

Step 2K08 includes applying the model-view-projection matrix to position and scale vertices of spatial data within a geometry of the framebuffer. Applying the matrix transforms the position and scale of vertices of the spatial data.

Step 2K10 includes rendering vertex attributes of the vertices to pixels in a render buffer of the GPU. The vertex attributes are rendered to pixels using a rendering algorithm.

The method of FIG. 2K may terminate after step 2K10. The method of FIG. 2K may also continue from step 2K08, skipping step 2K10, and continuing instead with steps 2K12, 2K14, and 2K16. Thus, for example, steps 2K02 through 2K08, followed by 2K12 through 2K16, may form yet another method.

Step 2K12 includes using vertex attribute values to define an associated depth value for each vertex of vertices. Step 2K14 includes using the associated depth value for rendering the vertices into a depth buffer of the GPU. Step 2K16 includes applying a depth test to the vertices during rendering of the vertex attributes to pixels in a render buffer of the GPU.

As explained with respect to FIG. 1, if the data features overlap, the most extreme value for the final output is selected at each pixel. Depth testing is applied to allow the GPU to automatically and quickly decide which value to preserve for the final output.

Figure 2L:
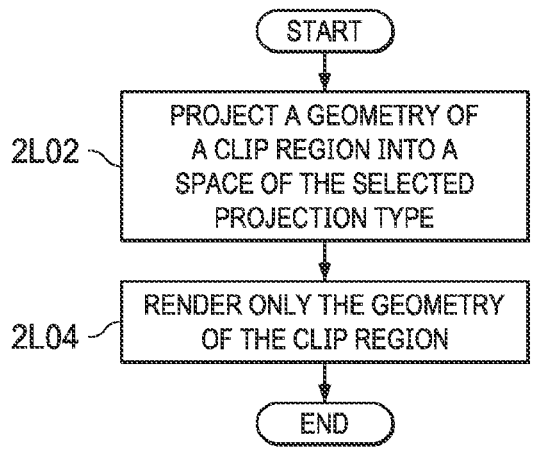

Attention is turned to FIG. 2L. FIG. 2L may be an extension of FIG. 2A.

Step 2L02 includes projecting a geometry of a clip region into a space of the selected projection type. Step 2L04 includes rendering only the geometry of the clip region. Step 2L02 and step 2L04 are explained by way of example in FIG. 7A and FIG. 7B.

Figure 2M:
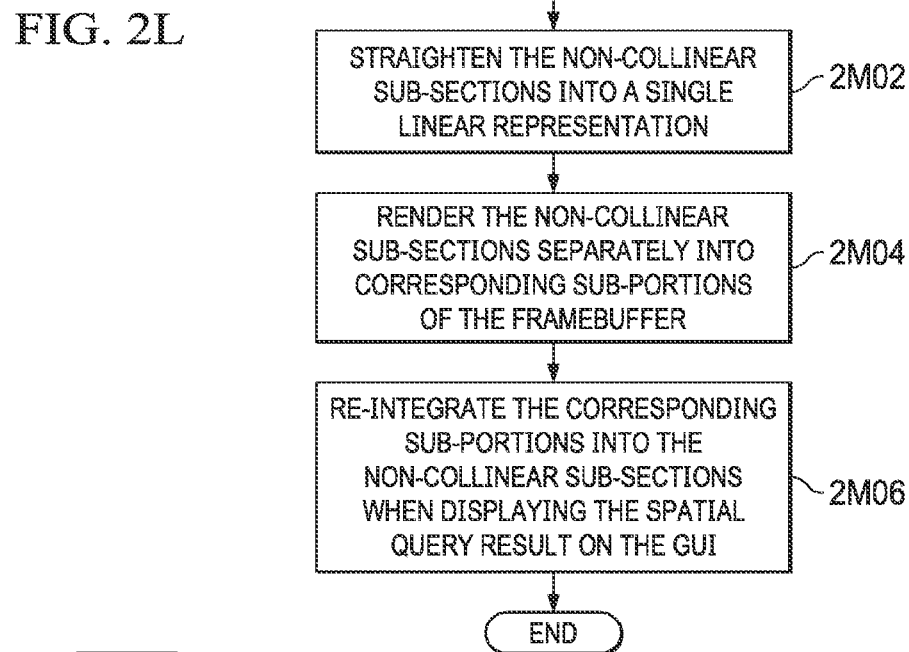
Figure 2N:
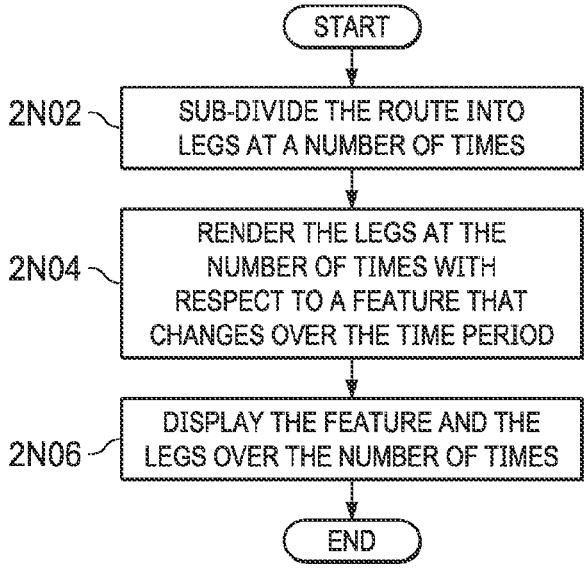

Attention is turned to FIG. 2M. The method of FIG. 2M is an extension of the method of FIG. 2A. FIG. 2M assumes that the spatial query is a complex geometric shape having non-collinear sub-sections within the spatial query extent. In this case, step 2M02 includes straightening the non-collinear sub-sections into a single linear representation. Step 2M04 includes rendering the non-collinear sub-sections separately into corresponding sub-portions of the framebuffer. Step 2M06 includes re-integrating the corresponding sub-portions into the non-collinear sub-sections when displaying the spatial query result on the GUI. Steps 2M02 through 2M04 are explained further by way of example in FIG. 7A and FIG. 7B.

Attention is turned to FIG. 2N. The method of FIG. 2N is an extension of the method of FIG. 2A. FIG. 2N assumes that the spatial query is a route of a vehicle (e.g., an aircraft, an automobile, a boat, etc.) over a time period. In this case, step 2N02 includes sub-dividing the route into legs at a number of times. Step 2N04 includes rendering the legs at the number of times with respect to a feature that changes over the time period. Step 2N06 includes displaying the feature and the legs over the number of times. Step 2N02 through 2N06 are explained further by way of example in FIG. 7A and FIG. 7B.

While the various steps in the flowcharts are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

FIG. 3 through FIG. 8D present a specific example of the techniques described above with respect to FIG. 1 through FIG. 2N. The following example is for explanatory purposes only and not intended to limit the scope of the one or more embodiments.

Figure 3:
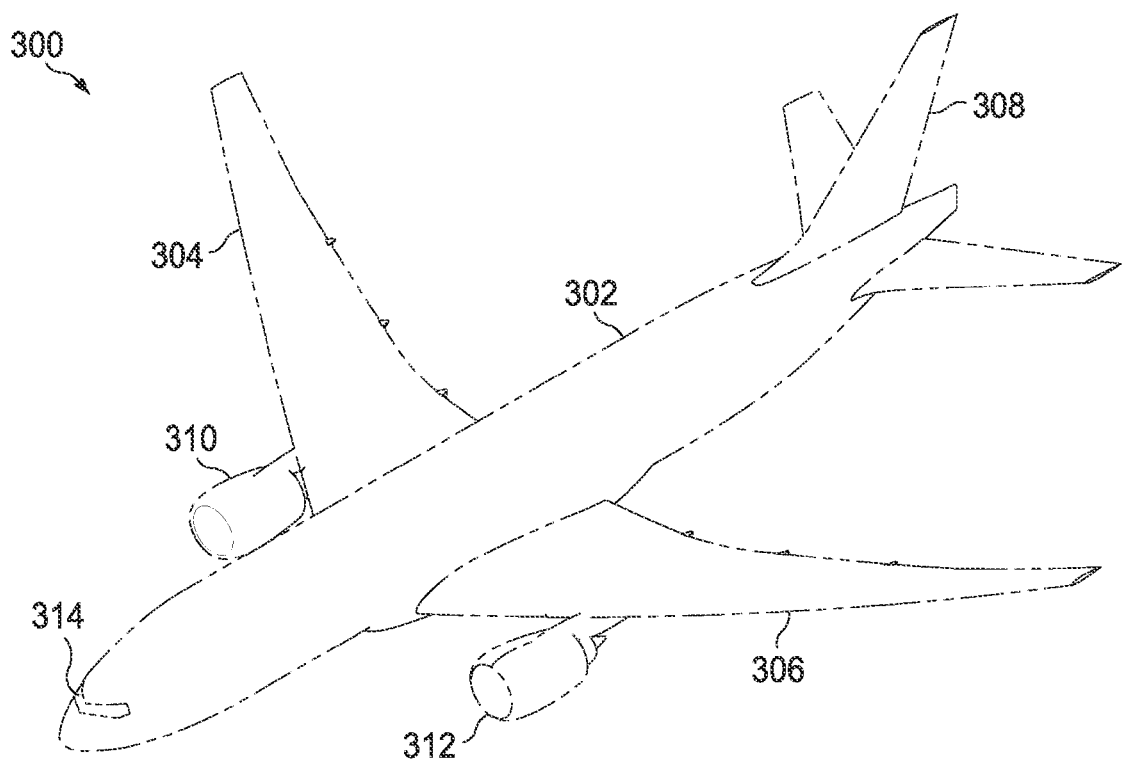
FIG. 3 shows an aircraft, in accordance with one or more embodiments.

FIG. 3 shows an aircraft, in accordance with one or more embodiments. The aircraft (300) includes a fuselage (302), a first wing (304), a second wing (306), and a tail (308). The aircraft (300) in one or more examples includes a propulsion system, such as first engine (310) and second engine (312). The aircraft (300) in one or more examples includes additional components, in addition to those described above.

In this example, a computing device (314) is accessible by a pilot of the aircraft. The computing device (314) may be a mobile phone, such as mobile phone (400) in FIG. 4, below. The computing device (314) may also be an on-board computer. The computing device (314) may be a display device that receives and displays data rendered according to the one or more embodiments described with respect to FIG. 2A through FIG. 2N.

Note that the aircraft (300) shown in FIG. 3 is only one specific example of objects that may be inspected according to the techniques described herein. The one or more embodiments may be used with respect to other types of aircraft, machines, buildings, and many other objects.

Figure 4:
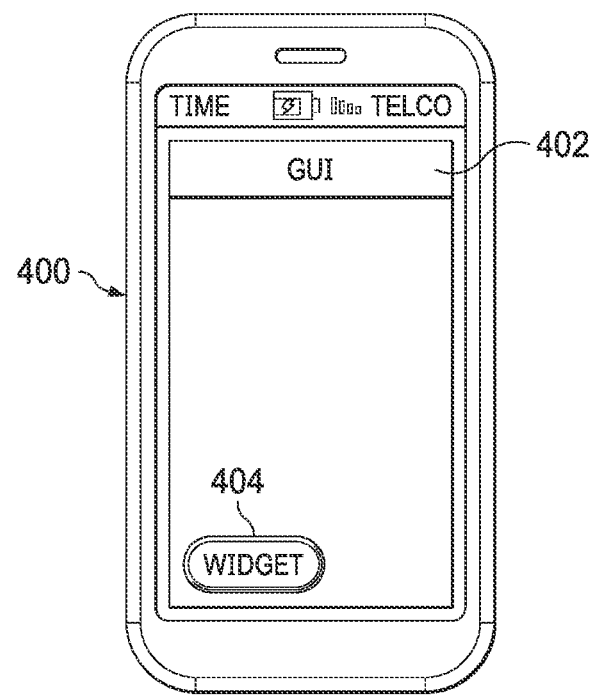
FIG. 4 shows a computing device, in accordance with one or more embodiments.

FIG. 4 shows a computing device, in accordance with one or more embodiments. In particular, FIG. 4 shows mobile phone (400), though the mobile phone (400) may be a tablet, a laptop, or some other computing device.

In the example of FIG. 4, the mobile phone (400) has a GUI (402). The GUI (402) displays images. A user may query information about the image via a widget (404) in the GUI (402). A widget is a button, slider, drop-down menu, etc. which a user may manipulate to query the image or otherwise manipulate the GUI (402). Multiple widgets may be present.

Figure 5:
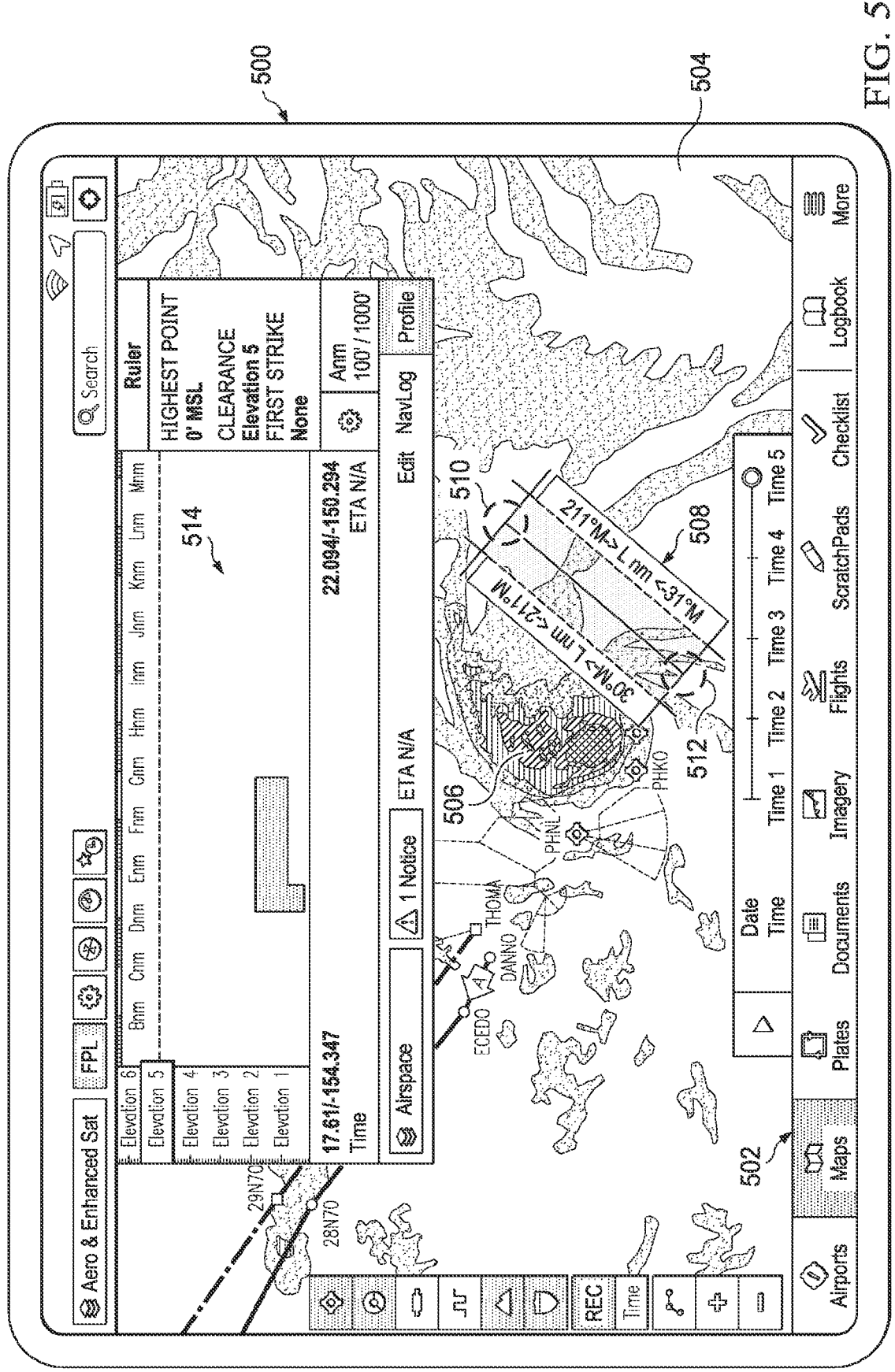
FIG. 5 shows a screenshot of a first phase of a graphical query, in accordance with one or more embodiments.

The GUI (402) may display the image shown in FIG. 5. A CPU and GPU of the mobile phone (400) may then perform any of the methods of FIG. 2A through FIG. 2N, or of FIG. 5, in order to display the images shown in FIG. 6. The processing may also take place remotely, such as on a server, and then the rendered data transmitted for display on the mobile phone (400).

Figure 6:
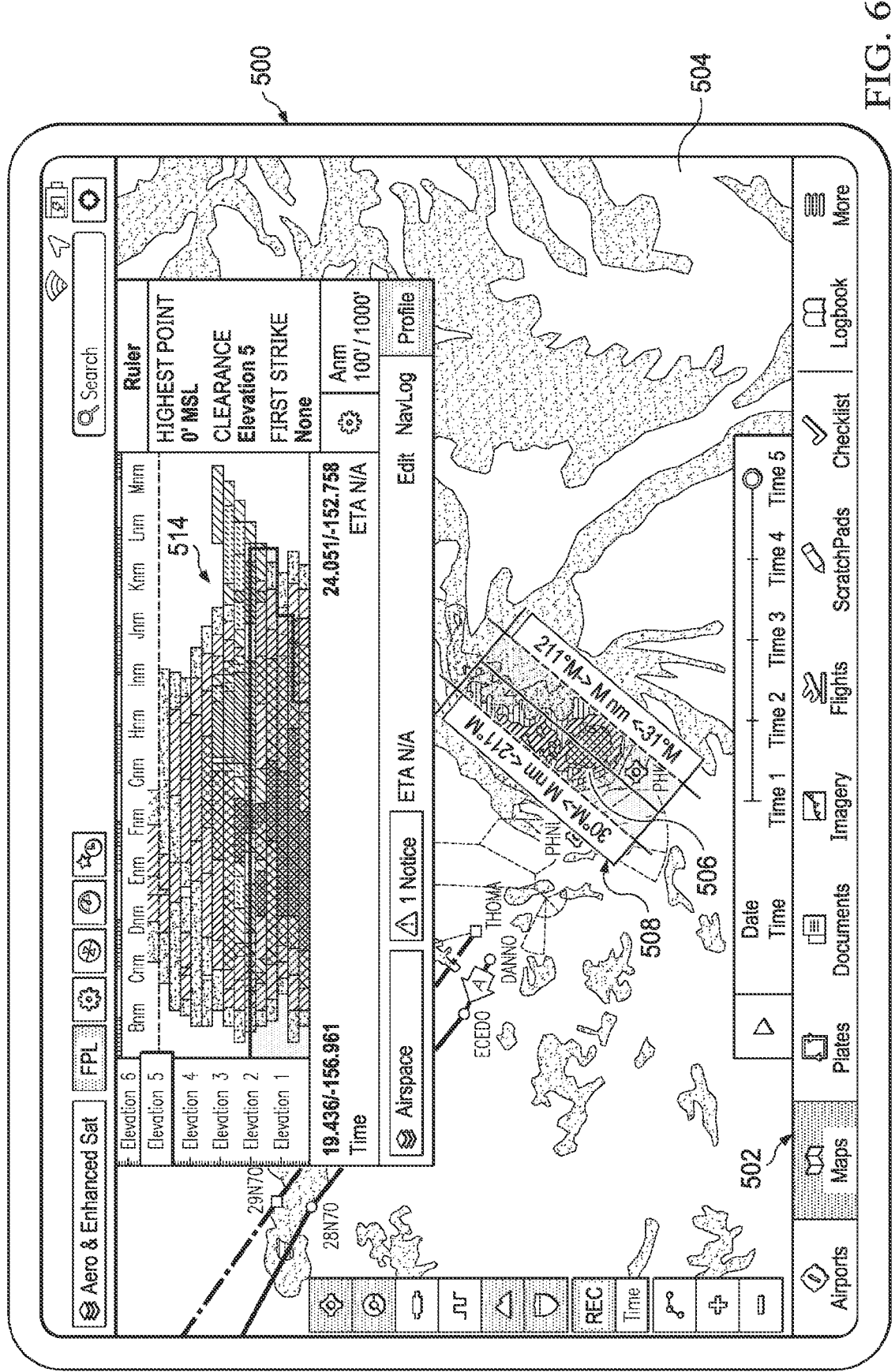
FIG. 6 shows a screenshot of a second phase of a graphical query, in accordance with one or more embodiments.

FIG. 5 and FIG. 6 should be considered together. FIG. 5 shows a screenshot of a first phase of a graphical query, in accordance with one or more embodiments. FIG. 6 shows a screenshot of a second phase of a graphical query, in accordance with one or more embodiments. Together, FIG. 5 and FIG. 6 show an example of the one or more embodiments in use.

FIG. 5 shows a GUI (500) having a number of widgets, such as widget (502). The GUI (500) shows an image (504). The image (504) is a map of an area of the Earth. A weather pattern (506) is displayed in the image (504).

The user is a pilot of an aircraft. The pilot is interested in gathering more detail regarding the weather pattern (506), and is particularly interested in seeing how the weather pattern (506) varies with both elevation over the Earth, and location. In other words, the user wants to know how the weather pattern (506) will change at different elevations as the pilot flies through the weather pattern (506), before the pilot commits to such a flight path.

To begin, the pilot defines the boundaries of a spatial query (508) using a two finger touch at point (510) and point (512) on the touchscreen of the GUI (500). Information regarding the relative distance of the spatial query (508) is shown on the representation of the spatial query (508). For example, the spatial query (508) represents 352 nautical miles, in this example. The spatial query (508) is, in particular, information along the line shown in the shading between the point (510) and the point (512).

The relevant weather data, by elevation, is shown in overlay window (514). The overlay window (514) is overlaid the image (504) so that the user can see both the spatial query (508) and the overlay window (514) concurrently.

Attention is now turned to FIG. 6. The user moves the spatial query (508) using a swipe gesture across the GUI (500). In particular, the user moves the spatial query (508) through the weather pattern (506).

The overlay window (514) has changed. The intensity of weather along the line that defines the spatial query (508) is shown by elevation. In other words, the overlay window (514) shows a cross section of the weather pattern (506), by elevation, along the line defined by the spatial query (508).

In use, the user can dynamically move the spatial query (508) back and forth across the GUI (500), and a cross section of the intensity of weather by elevation will continually change in the overlay window (514) based on the relative position of the spatial query (508) on the image (504).

The technical challenge addressed by the one or more embodiments is rendering the information shown in the overlay window (514) with sufficient speed that the user perceives no slow-down in the rendering of the image in the overlay window (514). For example, the user may move the spatial query (508) back-and-forth over the image (504), the user may choose to define a new spatial query somewhere else along the map, or the user may choose to define a new spatial query along a different cross-section of the weather pattern (506). In each case, the amount of data processing required to render the overlay window (514) may be computationally expensive, resulting in slow-down or even application crash, and hence user dissatisfaction.

A more technical approach to the technical challenge and the one or more embodiments is set forth. The technical description presented with respect to FIG. 2A through FIG. 6 is a variation of the one or more embodiments described with respect to FIG. 1 through FIG. 2N.

The technical challenge is to perform a fast query of geospatial data representing features on the globe. Software applications often allow the user to interact with, and query, map data. For example, a user may want to see all of the map features (i.e., point, line, or area features on a map) that intersect a corridor along the shortest-distance path between two points on the globe. The output of the query may be the extraction and subsequent display of the portions of the feature that coincide with the query path/corridor (e.g., a visual representation of map features within the query corridor), or some abstraction of the resulting query (e.g., a set of times or distances until encountering each feature that falls within the corridor, while traveling along that path).

For spatial queries involving large data sets and many features, such as in FIG. 5 and FIG. 6, there are three sub tasks. The first sub-task is projecting the map features and the user-specified query boundaries into the same projected map coordinate system. The second sub-task is checking each feature to determine whether or not each feature intersects the query area. The third sub-task is, depending on query, clipping the resulting geometry to the requested query boundary region. The three sub-tasks, taken together, can be very computationally costly and time consuming.

For an interactive application in which the user can update the query in real time, the query very often cannot keep up with the user's expectations, resulting in a very slow update process and a halting, delayed, or otherwise unsatisfactory user experience. The challenge is, thus, to be able to perform spatial queries of large map data sets, and produce results very quickly in order to provide a fluid, consistently updating user experience.

The one or more embodiments use projection formulas, most of which involve some amount of computationally expensive trigonometric function calls. Software libraries (such as the PROJ library) exist to perform geodetic projection. Packages such as the General Polygon Clipper (GPC) are available to perform intersection calculations on the CPU. Approaches such as R-trees can be used to pare down the list of candidate features to be tested and intersected, in order to speed computation times.

However, existing approaches and software libraries for projecting coordinates, and for performing calculations on geospatial data, are CPU-based. On many devices, these packages are too slow to perform the queries at a rate that matches the user's ability to change query parameters, and thus results in a slow and/or halting update rate and an unsatisfactory user experience, including time delays in showing results that can make basic interaction difficult.

This slowness results from four factors. The first factor is a limited ability to parallelize operations by the CPU. The second factor is the use of slow, trigonometric functions on the CPU as part of standard map coordinate projections and related geometry calculations. The third factor is the need to involve a conditional check on candidate points. The fourth factor is the need for additional computations to calculate intersection points of line segments with the user-selected corridor boundaries.

The one or more embodiments provided here speeds up spatial queries by setting up the queries to be performed on the device's GPU, in a particular manner. The query of the one or more embodiments leverages the highly parallel, very fast processing and math used to perform real-time graphics updates on the device. In addition, some of the steps required in a CPU-based solution (such as determining whether geometry is inside or outside the query area, and intersecting geometry to provide clipped results) are functionally eliminated when using the GPU instead. The GPU can perform such functions at essentially no cost as part of the normal graphics processing pipeline of the GPU.

A useful component of the one or more embodiments is the selection of a projected coordinate space for the geometry and query boundaries, in combination with a graphical projection during the rendering stage, that produces recoverable, real-world geometry of the rendered result. In practice, the specific coordinate projection may depend on the nature of the specific query.

The rendering projection (via the Model-View-Projection matrix in the GPU vertex shader) likewise is selected to maintain appropriate geometry in a recoverable fashion, and may change depending on the specific query involved. This process allows subsequent association of results and map locations by providing simple conversions from rendered pixel coordinates to map locations, and vice-versa. The one or more embodiments includes a combination of processes to quickly perform area-based queries of map features on the GPU.

First, the one or more embodiments use an appropriate map projection to simplify the representation of map features within a query region, and to allow the GPU, rather than the CPU, to perform map projections and geometric processing. Second, the one or more embodiments use GPU rendering logic that automatically sorts and clips features within a query region. Third, the one or more embodiments use a grid-based data model that is amenable to both the GPU map computations above, and subsequent data extraction by the client code. Fourth, selection of an appropriate projection matrix can produce a reduction of dimensionality as needed at no extra cost. Additional details regarding the process are described with respect to FIG. 7A and FIG. 7B, as well as FIG. 8A through FIG. 8D.

Figure 7A:
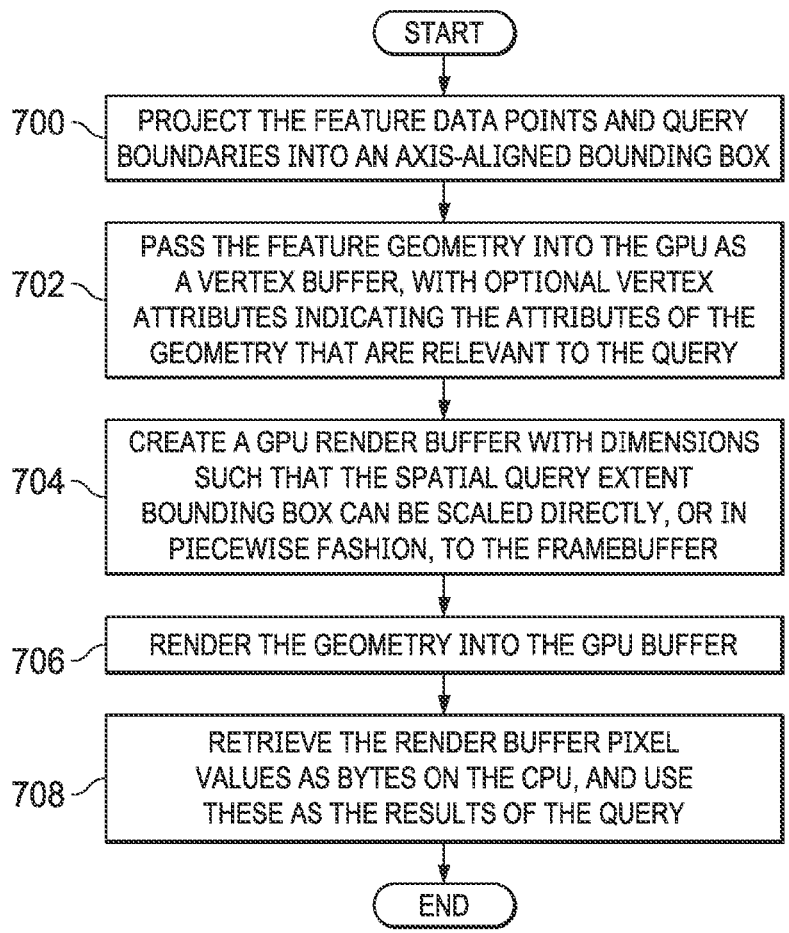
FIG. 7A and FIG. 7B show methods of rendering, in accordance with one or more embodiments.
Figure 7B:
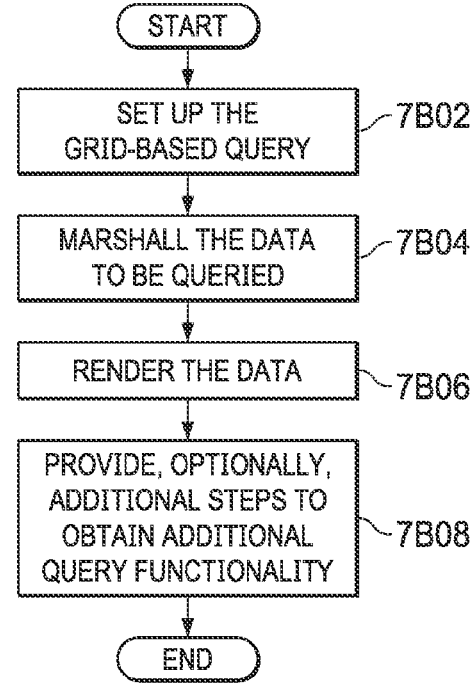

FIG. 7A and FIG. 7B show methods of rendering, in accordance with one or more embodiments. The methods of FIG. 7A and FIG. 7B are a variation of the method of FIG. 2A through FIG. 2N. The methods of FIG. 7A and FIG. 7B may be implemented using the system of FIG. 1. The methods of FIG. 7A and FIG. 7B may be executed using one or more components from the computing system and network environment shown in FIG. 9A and FIG. 9B.

Attention is first turned to FIG. 7A. Step 700 includes projecting the feature data points and query boundaries into an axis-aligned bounding box. Step 700 is accomplished by selecting a projection (e.g., a geodetic map projection) that will project vertices into a two-dimensional cartesian coordinate space, such that the query extent bounding box edges are parallel to the "X" and "Y" axes.

Step 702 includes passing the feature geometry into the GPU as a vertex buffer, with optional vertex attributes indicating the attributes of the geometry that are relevant to the query. An example of optional vertex attributes are weather classifications associated with polygons.

Step 704 includes creating a GPU render buffer with dimensions such that the spatial query extent bounding box can be scaled directly, or in piecewise fashion, to the framebuffer. Step 704 may be performed off-screen (i.e., not displayed).

Step 706 includes rendering the geometry into the GPU buffer. Rendering is performed using a vertex shader that associates any additional attributes with each vertex and, in some embodiments, applies the selected projection to the vertices. A fragment shader takes the attributes and uses the attributes to set the output channels for the render. In graphics rendering terminology, the output channels would normally be taken as the output pixel color and transparency. However, with respect to the one or more embodiments, the output channels are rendered offscreen. The output is interpreted as the combination of geometry and attributes of interest.

Step 708 includes retrieving the render buffer pixel values as bytes on the CPU, and using these as the results of the query. In other words, now that the GPU has performed work of processing the pixels that make up the image, the CPU can use the result to extract information or to direct subsequent rendering on the screen.

Attention is now turned to FIG. 7B. FIG. 7B is an alternative method for accomplishing the one or more embodiments. The method of FIG. 7B may be used, in particular, with respect to the specific example shown in FIG. 5 and FIG. 6.

Step 7B02 includes setting up the grid-based query. Step 7B02 may include six sub-steps.

A first sub-step is to determine an appropriate map projection that allows a two-dimensional, cartesian representation of the query region with desired accuracy characteristics. This sub-step will depend on the nature of the query. For example, long, narrow, path-based queries may be best represented using cylindrical projections.

A second sub-step is to determine the ground sample distance (GSD) to be used for the results. For example, the request may specify a multi-leg route that totals 1156 nautical miles (NM) in length, 10 NM across, with a requested ground sample distance of 0.1 NM. This selection would imply a "pixelated" corridor depiction of 11560 samples in length by 100 samples across, or a total of 1,156,000 samples or pixels.

A third sub-step includes determining the actual GSD to use. There are limits on the size of GPU buffers. For example, some older devices are limited to 2048 × 2048 pixels, or 4194304 total pixels. If the initial number of pixels required (1156000 in the example above) is larger than the number available within the GPU, the requested GSD can be increased in order to reduce the final required number of pixels such that the final number is less than or equal to the number available in the GPU's buffer. Alternatively, the query may be broken into multiple queries in order to maintain the original requested GSD. Breaking the query may be performed using multiple iterations of the one or more embodiments.

A fourth sub-step is optional for queries that have gridded dimensions that exceed the maximum allowed height or width dimensions of the GPU buffer. The fourth sub-step includes determining the arrangement of portions of the query region to fit within the maximum allowed GPU buffer dimensions. Because the GPU buffer has a limited width and height, the GPU buffer may not be possible to fit the spatial query extent into a single render within the buffer and still maintain the final GSD. In the example above, the 1156000 × 100 pixel buffer requires fewer pixels than the example 2048 × 2048 GPU buffer, but cannot fit in a single render within that buffer. Thus, the corridor in this example would be subdivided into 2048 × 100 pixel sections or "chunks", with each chunk being rendered into a distinct portion of the 2048 × 2048 GPU buffer. In this example, the final number of chunks is determined as "numChunks = pixels_along_track / maxGPUFrameBufferWidth."

A fifth sub-step is to determine a final buffer size. A GPU buffer is created that is as large as necessary to accommodate the projected spatial query extent. The framebuffer size will be the minimum rectangular buffer size to accommodate the projected query region at the specified GSD, whether as a single contiguous region or broken into subregions compactly arranged within a rectangular framebuffer region. For cases where the query into is broken into subregions, some unused pixels may exist in the framebuffer after the end of the last chunk within the framebuffer.

A sixth sub-step is to create the GPU render buffer at the final buffer size. The exact details depend on GPU technology used, but may be implemented using OpenGL, OpenGL ES, Metal, DirectX, or others.

Step 7B04 includes marshalling the data to be queried. The one or more embodiments can be applied to many types of points, lines, or area queries on the globe. The one or more embodiments can be useful to reduce the data that needs to be considered for the query. In the specific example here, a corridor-based query shown in FIG. 5 and FIG. 6, the one or more embodiments identify spherical Mercator tiles that intersect the requested corridor.

Step 7B04 may include setting one or more vertex attributes to represent the desired feature properties for the query. The vertex attributes will be used during the rendering stage, and are a useful aspect of the one or more embodiments.

For example, if the features represent current weather conditions for icing, each polygon feature would have a category attribute indicating whether it was light, moderate, or heavy icing. These category attributes are codified using ordered values (1,2,3, respectively) with higher values representing more severe weather. These category attributes are then coded into, for example, a color attribute for each vertex within the feature. For example, the red channel attribute for each vertex of a "moderate" icing polygon would be set to 2 (for a 0..255 color representation) or 2.0/255.0 for a 0..1 color representation, depending on the graphics technology being used.

Step 7B06 includes rendering the data. Rendering the data may include seven sub-steps.

A first sub-step is to clear the GPU render buffer with an appropriate value. The execution of the first sub-step depends on the nature of the query, but typically would be zeros, or a specific "NO_DATA" value.

A second sub-step is optional, used for certain types of categorical data attributes. The second sub-step includes creating a GPU depth buffer having the same size as the GPU render buffer. The depth buffer is cleared it with a maximum value (e.g., 1.0). Depth testing is enabled with a comparison function of "less than" (the details vary by rendering technology used). The second sub-step is used when sorting categorical data attributes, with follow-up steps as described above.

A third sub-step is to add the geodetic data for the features with their associated attributes into the appropriate GPU data buffers. Optionally, the geodetic data for the features is projected into the coordinate space selected for the query before adding the data to the GPU buffers A fourth sub-step is to create a "Model-View-Projection" matrix for rendering. Creation involves scaling and translating. Scaling includes scaling the projected data such that each GSD-size portion of the projected coordinate space becomes one pixel of rendered output. Translating includes translating the projected data so that the lower-left corner of the bounding box for the query region, in projected coordinates, aligns with the lower-left pixel of the GPU frame buffer. This type of matrix will often produce an orthographic projection (as opposed to a perspective projection as is typically used in graphic rendering) to preserve spatial relationships.

A fifth sub-step is to render the feature geometry into the GPU frame buffer. A vertex shader program is used to apply the Model-View-Projection matrix to align vertices within the query region with the frame buffer. Optionally, the vertex shader program may be used to project the geodetic data into the coordinate space selected for the query (if not previously performed as part of the third sub-step), prior to applying the Model-View-Projection matrix. The vertex shader program may optionally set the Z or depth value for use in depth buffering. Depth buffering is useful, for example, to select a single feature to be represented at a given output pixel, when there are multiple, overlapping polygons. In this case, one of the vertex attributes may be used to set depth as a means to reflect priority. The vertex program is then followed by a fragment shader program that assigns the extent vertex attributes to pixels in the GPU render buffer.

A sixth sub-step is to retrieve query results. The contents of the GPU framebuffer are copied to, or otherwise accessed by, the CPU. The use of an orthographic projection matrix allows the use of a simple, linear function to: i) recover the projected coordinates of any pixel, ii) retrieve values for locations by converting from projected coordinates to pixel space, and iii) access that pixel to see what value was rendered there. For example, if feature attributes were encoded as color attributes as in the icing example, the red value for the pixel would be retrieved and interpreted as (0) no icing, (1) light icing, etc.

A seventh sub-step may be to reduce the results. The results may be reduced to represent distances along a route-type query.

Step 7B08 includes providing, optionally, additional steps to obtain additional query functionality. Several different additional steps are present. The additional steps may be used in individually or, in some cases, in combination.

A first optional step is to indicate spatial data availability or missing data. In this case, use a geometry, such as polygon geometry, indicating the known extent available data. The data extent can be thought of as the valid region of the feature data set. For example, a data set may be some spatial data for a given country, in which case the data extent could be the boundaries of the country.

Before rendering any of the feature geometry, first project the geometry of the data extent into the coordinate space selected for the query. Then, add the projected data with their associated attributes into the appropriate GPU data buffers. The details are dependent on the specific rendering technology used. In this case, the vertex attributes could be zero, used in combination with a distinct NO_DATA value in the clear stage above.

Next, the data extent is rendered. Rendering the data extent would typically entail using a vertex shader program that applies the Model-View-Projection matrix. The vertex shader program may optionally set the Z or depth value for use in depth buffering. The vertex program is then followed by a fragment shader program that assigns the extent vertex attributes to pixels in the GPU render buffer. For example, the frame buffer could have initially been filled with a distinct NO_DATA value (e.g. -9999), and then a country boundary rendered so that the country polygon is filled with zeros. A zero in the final result can then be interpreted as "this location was part of the extent covered by a valid data set."

A second optional step is to perform geometric clipping of features to a defined area, a clip region, which may be one or more polygons. The exact details depend on the rendering technology used, but the concept is similar to the above: create a stencil using the clip region geometry, such that only features inside the specified clip region will appear in the final result.

Locations outside the clip region are flagged with some appropriate value (such as may be set during the buffer clearing operation above). Then, the geometry of the clip region is projected into the coordinate space selected for the query. The projected data are added with their associated attributes into the appropriate GPU data buffers. The details are dependent on the specific rendering technology used. In this case, the vertex attributes could be zero, used in combination with a distinct NO_DATA value in the clear stage above.

Next, the clip region geometry is rendered. Rendering the clip geometry entails using a vertex shader program that applies the Model-View-Projection matrix. Depending on the rendering technology used, rendering may involve an additional render buffer.

The vertex program is then followed by a fragment shader program that assigns the extent vertex attributes to pixels in the GPU render buffer. For example, the frame buffer would have initially been filled with a distinct NO_DATA value (e.g. -9999), and then a country boundary rendered so that the country polygon is filled with zeros. A zero in the final result can then be interpreted as "this location was part of the extent covered by the specified clip region."

Next, when rendering the feature geometry of interest, the fragment shader is modified when appropriate, depending on the specific rendering technology used. Modifying the fragment shader is performed either to render or to exclude pixels based on whether the pixels are inside the stencil area defined by the clip region.

A third optional step is to perform multi-pass rendering. A given query may be performed in multiple passes. For example, if the query represents a long, narrow region, and the result grid for the region is larger than the maximum dimension of the available GPU frame buffer, the query may be subdivided into subsections. Each of the subsections is no longer than the maximum GPU frame buffer dimension.

After the initial clearing of the frame buffer, each subsection is rendered into the frame buffer separately, modifying the translation of the Model-View-Projection matrix, and creating a scissor region, to limit rendering into an appropriate section of the frame buffer.

The entire query region can thus be packed into a single frame buffer, and the results retrieved and reconstituted to correct geodetic coordinates. Packaging is accomplished by creating metadata that stores a number of subsections and a size and location (offset) of each subsection within the final framebuffer output.

A fourth optional step is to perform a re-projective query. A complex query, such as a multi-leg route with a fixed-width corridor, may be projected in a fashion that "straightens" the legs into a single linear representation. As used herein, a "leg" is a segment of a multi-segment path.

This fourth optional step is a variation of multi-pass rendering, in which the geometry for each leg is rendered separately, with a different projection that aligns it into a common coordinate space. Each leg is rendered separately into the frame buffer with appropriate translations (via the Model-View-Projection matrix) and scissoring. Thus, the route is packed into the buffer as if the route were a single, straight route. This procedure allows along-track distances to be more easily calculated for any feature or pixel in the spatial query result.

A fifth optional step is to perform a multi-data query. The multi-data query is another multi-pass rendering approach. Here, interleaving or otherwise combining the different data sets into the final query result is performed.

As an example, consider a pilot travelling in an aircraft along some route at a predicted speed. The pilot wants to know what the weather forecast will be along each point in the journey. A route-based query is constructed, but subqueries are constructed by subdividing the route into legs such that the legs match available forecast periods based on predicted travel speed. Then, each leg is rendered using the appropriate corresponding forecast data (as spatial data). Offsets and scissors regions are created as appropriate, as for the other multi-render queries discussed above.

Using the multi-data query, the GPU thus takes several actions. First, the GPU projects map features into the specified query area. Second, the GPU clips map features to the user-specified query area. Third, the GPU automatically arranges ordered-value data as desired.

By setting color attributes appropriately, it is possible to have multiple independent results and/or attributes in the output. For example, a different attribute may be coded into each of the four (RGBA) color channels. Alternatively, multiple sets of independent features can be queried in a single pass. For example, querying multiple sets of independent features may be performed by rendering one feature type into the red channel, another into the green channel, etc.

The one or more embodiments described above can be combined into compound queries. In the example depicted in FIG. 5 and FIG. 6, a pilot is interested in gathering more detail regarding a weather pattern, and is particularly interested in seeing how the weather pattern varies with both elevation over the Earth, and location. A query is constructed using user-specified locations, and the query is repeated on multiple data sets, where each data set represents the weather pattern at a single elevation. The results from queries at multiple elevations are combined into a single output, which can be used to produce an elevation profile of the weather pattern, such as that shown in the overlay window (514) of FIG. 6.

The one or more embodiments described above can potentially prolong the battery life of mobile devices by using a more efficient means of computing a query geometry and computing intersections. The one or more embodiments also free the CPU of the device to perform other functions, thereby improving the speed of operation of the device with respect to other tasks being performed concurrently with the rendering operations described herein.

FIG. 8A, FIG. 8B, FIG. 8C, and FIG. 8D show an example of phases of mapping regions in projected map coordinate space to a framebuffer, in accordance with one or more embodiments. Legend (800) shows the meaning of symbology used in FIG. 8A through FIG. 8D. The example of FIG. 8A through FIG. 8D assumes that a two-dimensional grid-style query result is desired.

Figure 8A:
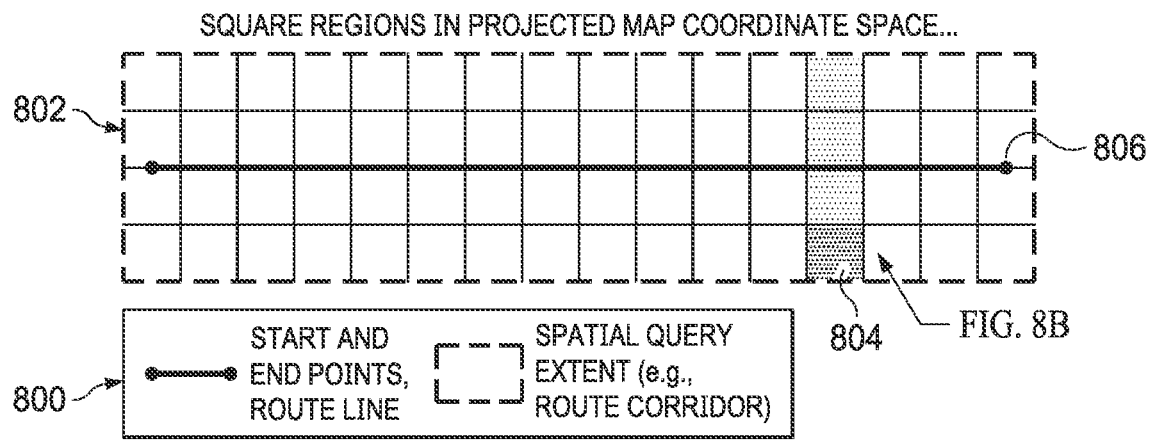
FIG. 8A, FIG. 8B, FIG. 8C, and FIG. 8D show an example of phases of mapping regions in projected map coordinate space to a framebuffer, in accordance with one or more embodiments.
Figure 8B:
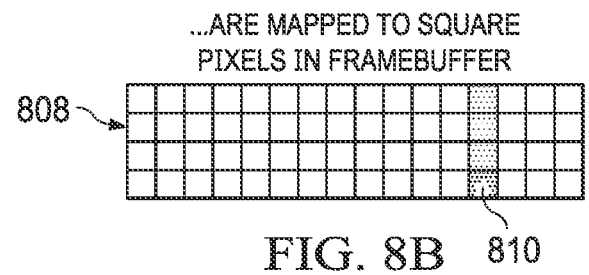
Figure 8C:
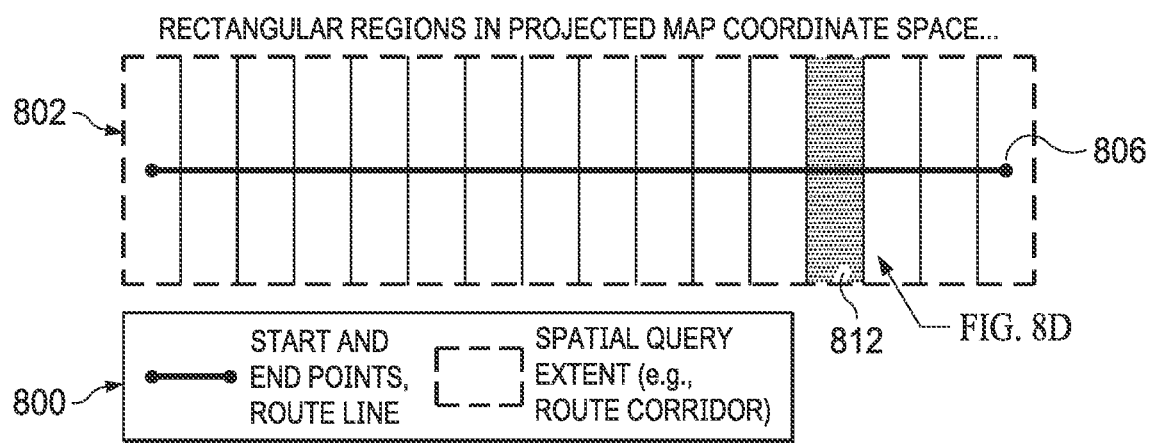
Figure 8D:
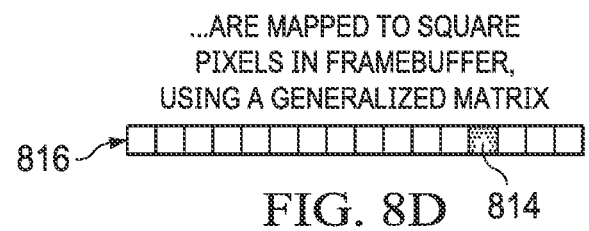

In the example depicted by FIG. 8A and FIG. 8B, the model-view-projection (MVP) matrix is constructed to map square ground regions into square framebuffer pixels. If a one dimensional, linear-style result is needed instead (as for profiles), then the MVP matrix can be constructed differently, so that the MVP matrix maps a rectangular ground region into each framebuffer pixel, as depicted by FIG. 8C and FIG. 8D.

This procedure could be used, for example, to map an entire cross-track section of the query extent into a single output pixel. In the one dimensional case, the resulting framebuffer would only be one pixel wide for each section of the route, but each pixel would represent the width of the corridor. (The width of the corridor is the width of the spatial query extent.) This one dimensional, linear-style would be appropriate for the spatial query shown in FIG. 5 and FIG. 6. Here, the one or more embodiments are causing the GPU to process this step as part of rendering, instead of aggregating the values after the fact on the CPU. As a result, significant computing resources are saved, and the process can more quickly render the spatial query.

Thus, for example, FIG. 8A shows a spatial query extent (802). The spatial query extent includes square regions, such as square region (804), which are sub-sections of the image. The start and end points of the spatial query extent (802) are shown on the line (806) shown in FIG. 8A.

As shown in FIG. 8B, the square region (804) is mapped to square pixels in a framebuffer (808). In this example, the square region (804) is mapped to square pixel (810).

FIG. 8C again shows the spatial query extent (802). Portions of the spatial query extent (802) have rectangular regions, instead of the square regions in FIG. 8A. In this case, rectangular regions, such as rectangular region (812), in projected map coordinate space are, as shown in FIG. 8D, mapped to a square pixel (814) in the framebuffer (816). The mapping is accomplished by modifying one scaling component and one translational component of the MVP matrix described above.

FIG. 9A and FIG. 9B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processor(s) (902), non-persistent storage device(s) (904) (e.g., volatile memory, such as random access memory (RAM), cache memory), persistent storage device(s) (906) (e.g., a hard disk, an optical drive such as a compact disk (CD) drive or digital versatile disk (DVD) drive, a flash memory, etc.), a communication interface (908) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) (902) may be one or more cores or micro-cores of a processor. The computing system (900) may also include one or more input device(s) (910), such as a touchscreen, a keyboard, a mouse, a microphone, a touchpad, an electronic pen, or any other type of input device.

The communication interface (908) may include an integrated circuit for connecting the computing system (900) to a network (not shown) (e.g., a local area network (LAN), a wide area network (WAN) such as the Internet, a mobile network, or any other type of network) and/or to another device, such as another computing device.

Further, the computing system (900) may include one or more output device(s) (912), such as a screen (e.g., a liquid crystal display (LCD), a plasma display, a touchscreen, a cathode ray tube (CRT) monitor, a projector, or other display device), a printer, an external storage, or any other output device. One or more of the output device(s) (912) may be the same or different from the input device(s) (910). The input and output device(s) (910 and 912) may be locally or remotely connected to the computer processor(s) (902), the non-persistent storage device(s) (904), and the persistent storage device(s) (906). Many different types of computing systems exist, and the aforementioned input and output device(s) (910 and 912) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system (900) shown in FIG. 9A, or a group of nodes combined may correspond to the computing system (900) shown in FIG. 9A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system (900) shown in FIG. 9A. Further, the client device (926) may include and/or perform all or a portion of the one or more embodiments.

The computing system (900) or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, touchscreen, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (900) in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (900) of FIG. 9A, while performing the one or more embodiments, may perform data comparison. Data comparison may be used to compare two or more data values (e.g., A, B). For example, one or more embodiments may determine whether A > B, A = B, A != B, A < B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A > B, B may be subtracted from A (i.e., A -B), and the status flags may be read to determine if the result is positive (i.e., if A > B, then A - B > 0). In one or more embodiments, B may be considered a threshold, and A is deemed to satisfy the threshold if A = B or if A > B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (900) in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (900) of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (900) of FIG. 9A and the nodes (e.g., node X (922), node Y (924)) and/or client device (926) in FIG. 9B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:
1. A method comprising:
receiving a spatial query on spatial data usable for generating a display on a graphical user interface (GUI) of a computer comprising a central processing unit (CPU) and a graphical processing unit (GPU) in communication with the CPU, wherein the spatial query has a spatial query extent comprising a sub-portion of the spatial data;
selecting a projection type for the spatial query;
creating a framebuffer for the projection type by adjusting a framebuffer extent to correspond to the spatial query extent;
establishing a plurality of vertex buffers to hold a geometry of the projection type;
passing the plurality of vertex buffers to the GPU;
rendering a spatial geometry of the spatial query extent into the framebuffer by projecting feature vertex data for features that fall at least partly within the spatial query extent into the plurality of vertex buffers, wherein projecting the feature vertex data is performed according to the projection type, and wherein rendering generates rendered framebuffer pixel values;
retrieving pixel values of the rendered framebuffer as bytes on the CPU;
and processing a spatial query result that includes or uses the pixel values.

2. The method of claim 1, wherein processing the spatial query result comprises one of: displaying the spatial query result on the GUI using the pixel values;
storing the spatial query result that includes the pixel values;
and passing the spatial query result that includes the pixel values to an additional application that takes the spatial query result as input.

3. The method of claim 1, wherein the display is an image comprising a map of terrain and wherein processing the spatial query result comprises:
displaying, using the pixel values as input data, the spatial query result as a second image overlaid on the image, wherein the second image displays weather information over the terrain.

4. The method of claim 1, wherein the spatial query is a type of query selected from the group consisting of:
a graphical query comprising an input received via the GUI;
one or more points provided by a user; and
one or more points from a non-graphical source.

5. The method of claim 1, wherein the spatial data comprises a sequence of vertices, and wherein the method further comprises:
determining a property within the spatial query extent; and
displaying the property.

6. The method of claim 1, further comprising:
assigning, as vertex attributes, ancillary data relating to a feature type of a feature in the spatial query extent.

7. The method of claim 1, further comprising:
scaling and aligning, as part of rendering, spatial features in the feature vertex data with pixel extents of the framebuffer.

8. The method of claim 1, further comprising:
determining that pixel dimensions of the spatial query extent exceeds a pixel buffer of the GPU;
subdividing the spatial query extent into a plurality of sub-sections such that each sub-section is within the pixel buffer of the GPU; and creating a plurality of corresponding sub-GPU render buffers having a corresponding plurality of sizes that match the plurality of sub-sections.

9. The method of claim 1, further comprising:
setting, as part of establishing the plurality of vertex buffers, a plurality of corresponding vertex attributes for the plurality of vertex buffers, wherein the plurality of corresponding vertex attributes represent a plurality of feature properties for the spatial query.

10. The method of claim 1, further comprising:
prior to rendering, clearing a render buffer of the GPU.

11. The method of claim 1, further comprising:
creating a depth buffer for the GPU to have a depth buffer size equal to a render buffer size a render buffer of the GPU.

12. The method of claim 1, further comprising:
projecting, as part of rendering, geodetic data for spatial features in the feature vertex data into a coordinate space selected for the spatial query, wherein projected data is established; and
adding the projected data and attributes of the projected data into a render buffer of the GPU.

13. The method of claim 1, further comprising:
determining scaling factors for projected data such that each fixed size, rectangular portion of a projected map coordinate space comprises one pixel of rendered output;
determining translation values for the projected data such that a lower-left corner of a bounding box of a query region of the spatial query, in projected coordinates, aligns with a lower-left pixel of a sub-section of a GPU frame buffer; and
establishing a model-view-projection matrix from a combination of the scaling factors and the translation values, wherein the model-view-projection matrix comprises an orthographic projection matrix.

14. The method of claim 13, further comprising:
applying the model-view-projection matrix to position and scale vertices of spatial data within a geometry of the framebuffer; and
rendering vertex attributes of the vertices to pixels in a render buffer of the GPU.

15. The method of claim 14, further comprising:
using vertex attribute values to define an associated depth value for each vertex of a plurality of vertices;
using the associated depth value for rendering the plurality of vertices into a depth buffer of the GPU; and
applying a depth test to the plurality of vertices during rendering.

16. The method of claim 1, further comprising:
projecting a geometry of a clip region into a space of the projection type; and
rendering only the geometry of the clip region.

17. The method of claim 1, wherein the spatial query comprises a complex geometric shape having a non-collinear plurality of sub-sections within the spatial query extent, and wherein the method further comprises:
straightening the non-collinear plurality of sub-sections into a single linear representation;
rendering the non-collinear plurality of sub-sections separately into corresponding sub-portions of the framebuffer; and
re-integrating the corresponding sub-portions into the non-collinear plurality of sub-sections when displaying the spatial query result on the GUI.

18. The method of claim 1, wherein the spatial query comprises a route of a vehicle over a time period, and wherein the method further comprises:
sub-dividing the route into a plurality of legs at a plurality of times;
rendering the plurality of legs at the plurality of times with respect to a feature that changes over the time period; and
displaying the feature and the plurality of legs over the plurality of times.

19. A system comprising:
a central processing unit (CPU);
a graphical processing unit (GPU) in communication with the CPU;
a non-transitory computer readable storage medium in communication with the CPU and the GPU, and further storing computer readable program code which, when executed by a combination of the CPU and the GPU, performs a computer-implemented method comprising:
receiving a spatial query on spatial data useable for generating a display on a graphical user interface (GUI), wherein the spatial query has a spatial query extent comprising a sub-portion of the spatial data;
selecting a projection type for the spatial query;
creating a framebuffer for the projection type by adjusting a framebuffer extent to correspond to the spatial query extent;
establishing a plurality of vertex buffers to hold a geometry of the projection type;
passing the plurality of vertex buffers to the GPU;
rendering a spatial geometry of the spatial query extent into the framebuffer by projecting vertex data for the spatial query extent into the plurality of vertex buffers, wherein projecting the vertex data is performed according to the projection type, and wherein rendering generates rendered framebuffer pixel values;

retrieving pixel values of the rendered framebuffer as bytes on the CPU;

and processing a spatial query result that includes or uses the pixel values.

20. A non-transitory computer readable storage medium in communication with a central processing unit (CPU) and a graphical processing unit (GPU), and further storing computer readable program code which, when executed by a combination of the CPU and the GPU, performs a computer-implemented method comprising:

receiving a spatial query on spatial data usable for generating a display on a graphical user interface (GUI) of a computer comprising a central processing unit (CPU) and a graphical processing unit (GPU) in communication with the CPU, wherein the spatial query has a spatial query extent comprising a sub-portion of the spatial data;

selecting a projection type for the spatial query;

creating a framebuffer for the projection type by adjusting a framebuffer extent to correspond to the spatial query extent;

establishing a plurality of vertex buffers to hold a geometry of the projection type;

passing the plurality of vertex buffers to the GPU;

rendering a spatial geometry of the spatial query extent into the framebuffer by projecting vertex data for the spatial query extent into the plurality of vertex buffers, wherein projecting the vertex data is performed according to the projection type, and wherein rendering generates rendered framebuffer pixel values;

retrieving pixel values of the rendered framebuffer as bytes on the CPU; and processing a spatial query result that includes or uses the pixel values.

* * * * *